United States Patent
Sakai

(10) Patent No.: US 8,015,007 B2
(45) Date of Patent: Sep. 6, 2011

(54) SPEECH RECOGNITION APPARATUS AND METHOD THEREOF

(75) Inventor: Masaru Sakai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 764 days.

(21) Appl. No.: 12/047,776

(22) Filed: Mar. 13, 2008

(65) Prior Publication Data
US 2009/0048839 A1   Feb. 19, 2009

(30) Foreign Application Priority Data
Aug. 17, 2007 (JP) .................. 2007-212811

(51) Int. Cl.
*G10L 15/00* (2006.01)
(52) U.S. Cl. ....................................... 704/240
(58) Field of Classification Search .................. 704/240
See application file for complete search history.

(56) References Cited

U.S. PATENT DOCUMENTS
2007/0219793 A1* 9/2007 Acero et al. .................. 704/240

FOREIGN PATENT DOCUMENTS
JP  10-254479  9/1998
* cited by examiner

*Primary Examiner* — Jakieda R Jackson
(74) *Attorney, Agent, or Firm* — Turocy & Watson, LLP

(57) ABSTRACT

A speech recognition apparatus includes a first grammar storage unit configured to store one or more grammar segments, a second grammar storage unit configured to store one or more grammar segments, a first decoder configured to carry out a decoding process by referring to the grammar segment stored in the second grammar storage unit, a grammar transfer unit configured to transfer a trailing grammar segment from the first grammar storage unit to the second grammar storage unit, a second decoder configured to operate in parallel to the grammar transfer unit and carry out the decoding process by referring to the grammar segment stored in the second grammar storage unit, and a recognition control unit configured to monitor the state of transfer of the trailing grammar segment carried out by the grammar transfer unit and activate the both decoders by switching the operation thereof according to the state of transfer of the grammar segment.

15 Claims, 19 Drawing Sheets

FIG. 2

| NUMBER OF PHRASES | FIRST PHRASES SEGMENT | SECOND PHRASES SEGMENT | THIRD PHRASES SEGMENT | FOURTH PHRASES SEGMENT |
|---|---|---|---|---|
| 1 | W11 | W21 | W31 | W41 |
| 2 | W11 | W21 | W32 | W41 |
| 3 | W11 | W22 | W33 | W41 |
| 4 | W11 | W22 | W34 | W41 |
| 5 | W21 | W23 | W35 | W42 |
| 6 | W21 | W24 | W36 | W42 |
| 7 | W21 | W25 | W37 | W42 |

AGGREGATION OF INITIAL STATE SS={S1}
AGGREGATION OF FINAL STATE SF={S4}

AGGREGATION OF INITIAL STATE SS={S1}
AGGREGATION OF FINAL STATE SF={S4}

SPEECH RECOGNITION APPARATUS AND METHOD THEREOF

CROSS-REFERENCE TO RELATED APPLICATIONS

This application is based upon and claims the benefit of priority from the prior Japanese Patent Application No. 2007-212811, filed on Aug. 17, 2007; the entire contents of which are incorporated herein by reference.

BACKGROUND OF THE INVENTION

1. Field of the Invention

The present invention relates to a speech recognition apparatus which uses grammar segments in which a phrase expressed on the basis of grammar is divided into one or more phrase segments when carrying out a speech recognition process for a phrase to be recognized expressed on the basis of the grammar.

2. Description of the Related Art

In the field of speech recognition, a speech recognition apparatus which carries out speech recognition by decoding speech features of a supplied speech and speech feature models corresponding to a phrase to be recognized which is described on the basis of grammar is widely used.

As the grammar with which vocabularies to be recognized are described, an expression on the basis of phrase network, Context-Free Grammar (CFG) and Finite State Grammar (FSG) are used.

These grammars are stored in a predetermined storage device in the interior of the speech recognition apparatus, and are referred from a decoder on the basis of the progress of a speech recognition process. The reference may be carried out a plurality of times during the speech recognition process. Therefore, in order to carry out the speech recognition process rapidly, the grammar should be stored in the storage device which is rapidly accessible. When the number of vocabularies to be recognized is increased, the size of the grammar in which the vocabularies to be recognized are described is increased correspondingly. Therefore, in order to carry out the speech recognition process with a large number of vocabularies, a large-capacity storage device for storing the grammar is required. In other words, the speech recognition apparatus is required to have a rapidly accessible and large capacity storage device in order to carry out the speech recognition process with a large number of vocabularies rapidly.

However, the rapidly accessible storage device requires higher cost than the storage device which enables only slow access. Since the cost of the storage device is increased with the capacity, the cost of the rapidly accessible and large capacity storage device is very high. Therefore, the speech recognition apparatus may not be provided with the rapidly accessible and high capacity storage device due to the above-described cost problem. In such a case, a storage device which enables only slow access but has a large capacity may be used instead. The storage device as such has a problem that the grammar referencing speed from the decoder is lowered, and hence the speed of the speech recognition process is lowered.

As a method for solving the problem, a technology disclosed in Japanese Patent No. 3546633 (see P. 14, FIG. 1) (hereinafter, referred to as "related art") is proposed. In the related art, grammar is divided into grammar segments each including a group of grammar regulations encapsulated therein, and all these grammar segments are stored in a storage device which enables only slow access but has a large capacity (storage device 1: HDD for example). Then, the grammar segment that the decoder refers to during the recognition process is stored in a storage device which is rapidly accessible but has only a small capacity (storage device 2: RAM for example). Then, according to the progress of the process carried out by the decoder, only the grammar segment that the decoder should refer to is transferred from the storage device 1 to the storage device 2. In other words, when the grammar segment that the decoder should refer to newly is not stored in the storage device 2, the process carried out by the decoder is stopped once, and the corresponding grammar segment is transferred from the storage device 1 to the storage device 2. When the transfer is completed, the process carried out by the decoder is started again.

According to the related art, only the grammar segment that the decoder needs to refer to must be stored, and hence the capacity of the storage device 1 is reduced.

For example, a case in which grammar segments are prepared for the respective groups (Prefecture, City, Town) of the respective hierarchies for the vocabularies to be recognized having a hierarchical structure such as addresses in Japan is considered. In this case, the grammar segments that the decoder should refer to are limited to the grammar segments relating to candidates to be recognized in the respective hierarchies. In other words, in the process carried out by the decoder, when "Kanagawa-ken" is emerged as a candidate of the name of the prefecture to be recognized, only the grammar segments describing the names of cities and towns relating to "Kanagawa-ken" may be referred to in the subsequent process. As a result, the number of grammar segments to be stored in the storage device 1 described above is limited, and hence the capacity of the storage device 1 may be further reduced. Since the grammar segment to be referred to by the decoder is stored in the rapidly accessible storage device 1, reference of the grammar segment from the decoder is maintained to be rapid. In other words, according to the related art, the speech recognition process is carried out rapidly while restraining the cost increase in association with increase in capacity of the storage device 1.

However, in the related art, when the grammar segment to be referred to newly by the decoder is not stored in the storage device 2, the decoder stops the process once until the corresponding grammar segment is transferred from the storage device 1 to the storage device 2 and the decoder starts the process again when the transfer is completed. In this case, when it takes time to transfer the grammar segment, the process carried out by the decoder, that is, execution of the speech recognition process is delayed by the time corresponding to the waiting time required for transferring the grammar segment.

In general, in order to transfer data from a certain storage device to another storage device, a lag time depending on the speed of the transfer path between the storage devices is generated. In the related art, since the transfer of the grammar segment from the storage device 1 which is accessible only slowly is assumed, a lag time which corresponds to the time that the grammar segment are read out from the storage device 1 is also generated. In the related art, the total length of the lag time is a lag time of the speech recognition process, and hence the speed of the speech recognition process is lowered correspondingly.

In other words, in the related art, there is a problem that the speed of the speech recognition process is lowered due to the waiting time required for transferring the grammar segment, so that the speech recognition process with a large number of vocabularies cannot be carried out rapidly.

In view of the above, its is aimed to provide a speech recognition apparatus in which lowering of the speed of a speech recognition process due to the waiting time required for transferring grammar segment is prevented so that rapid speech recognition process is achieved and a method of the same.

SUMMARY OF THE INVENTION

According to embodiments of the invention, there is provided a speech recognition apparatus including: a generating unit configured to generate sequences of speech features from features of entered speech for respective frames having an arbitrary temporal width; a model storage unit having a plurality of phrases expressed on basis of grammar and one or more continuous phrase segments obtained by dividing the respective phrase, the model storage unit configured to store state transition models which express time series changes of the speech features for respective phrase segments as state-to-state transition relating to the speech features; a first grammar storage unit that stores grammar segments relating to one or more continuous phrase segments which belong to each of the phrases; a second grammar storage unit that stores at least part of the grammar segments transferred from the first grammar storage unit and to be able to read out information stored therein in a reading time shorter than the same required for the first grammar storage unit; a first decoder that obtains forward probabilities of respective states of the state transition models for the sequence of speech features generated by the generating unit with respect to each of the frames, by referring to the grammar segments stored in the second grammar storage unit and the state transition models stored in the model storage unit; a grammar transfer unit that transfers a training grammar segment relating to a trailing phrase segment which trails one of said continuous phrase segments, from the first grammar storage unit to the second grammar storage unit when the forward probability of final state among said states of the state transition models is obtained by the first decoder; a second decoder that obtains the forward probabilities of the respective states of the state transition models for a sequence of trailing speech features as the sequence of speech features for the trailing segment as generated by the generating unit with respect to each of the frames, continuously after the speech feature sequences, by referring to the grammar segments stored in the second grammar storage unit and the state transition models stored in the model storage unit; a third decoder that obtains the forward probabilities of the respective states of the state transition models for the trailing speech feature sequences for the respective frames, by referring to the trailing grammar segment transferred to the second grammar storage unit and the state transition models stored in the model storage unit; a recognition control unit that (1) carries out recognition for the respective phrases, (2) activates the first decoder until the transfer of the trailing grammar segment is started, (3) activates the second decoder in parallel to the transfer from the start to the completion of the transfer, (4) activates the third decoder upon completion of the transfer, and (5) repeat the operations from (2) to (4) until all the operations for the phrase segments belonging to the respective phrases to obtain final forward probabilities for the respective phrases; and a recognizing unit that outputs the phrase which give the highest forward probability from among the respective final forward probabilities of the plurality of phrases as a result of recognition of the speech feature sequence.

According to the embodiments of the invention, the decoding operation is carried out in parallel to the transfer of the grammar segments so that lowering of the speed of the speech recognition process due to the waiting time for waiting the transfer of the grammar segment is prevented and the rapid speech recognition process is achieved.

BRIEF DESCRIPTION OF THE DRAWINGS

FIG. 2 shows examples of phrases to be recognized.

DETAILED DESCRIPTION OF THE INVENTION

Figure 1:
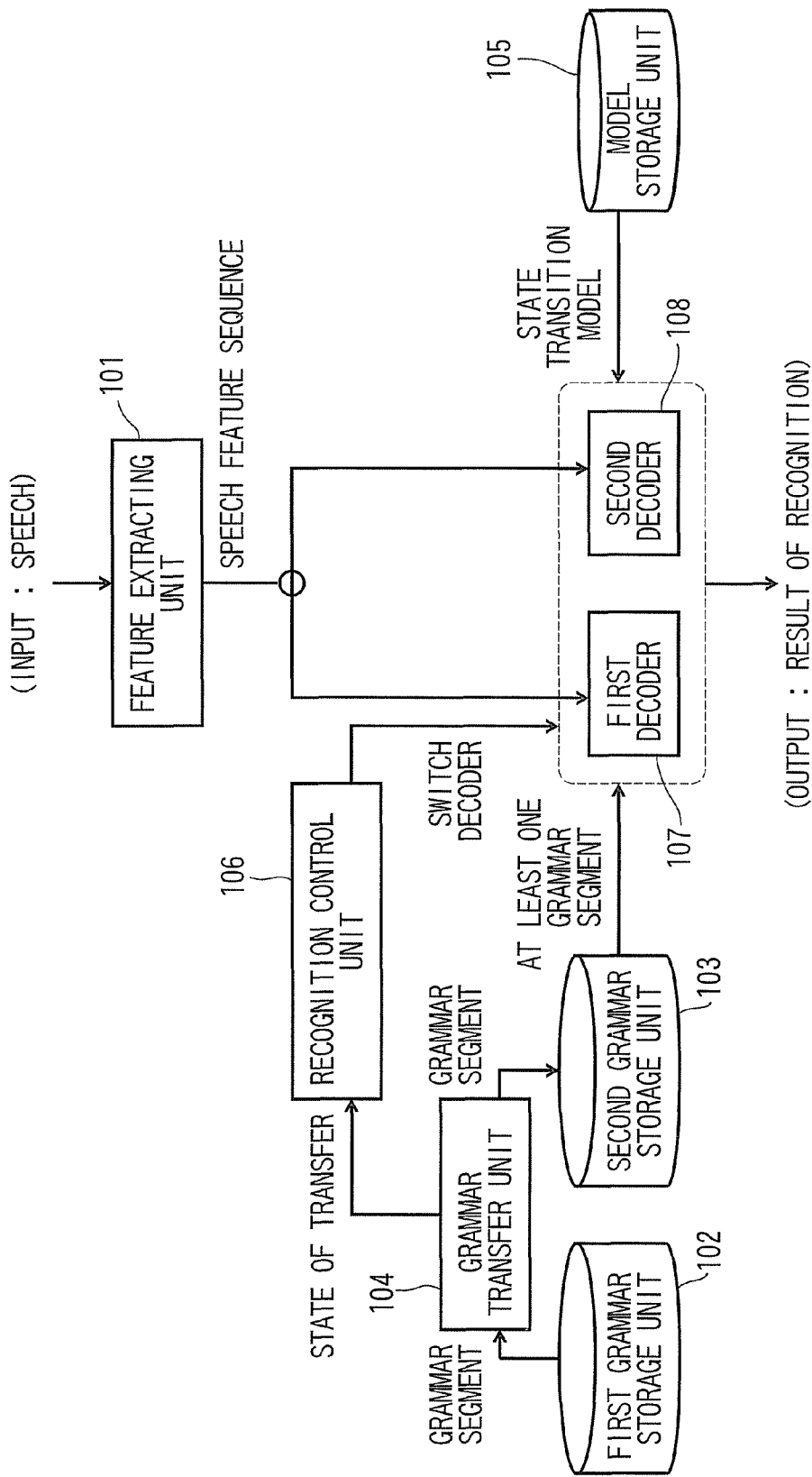
FIG. 1 is a block diagrams showing an example of the configuration of a speech recognition apparatus according to a first embodiment of the invention.

Referring now to the drawings, an embodiment of the invention will be described.

First Embodiment

Referring now to FIG. 1 to FIG. 14, a speech recognition apparatus according to a first embodiment of the invention will be described.

(1) Configuration of Speech Recognition Apparatus

FIG. 1 is a block diagrams showing an example of the configuration of the speech recognition apparatus according to the first embodiment.

The speech recognition apparatus includes a feature extracting unit 101, a first grammar storage unit 102, a second grammar storage unit 103, a grammar transfer unit 104, a model storage unit 105, a recognition control unit 106, a first decoder 107 and a second decoder 108.

The functions of the respective units 101 to 108 can be realized by a program stored in a computer.

The speech recognition apparatus will be described in detail with descriptions of the respective blocks.

(2) Feature Extracting Unit 101

The feature extracting unit 101 generates a speech feature sequence $X(t)=(x(1), x(2), \ldots, x(T))$ from an entered speed signal for each frame having a certain time width. In this expression, x(t) represents a speech feature in a $t^{th}$ frame t. In this case, $1 \leq t \leq T$ is established and t=1 corresponds to a start position of the supplied speech as a target of the speech recognition and t=T corresponds to an end position of the supplied speech.

Vector having one or more dimension elements is used for the speech feature. The speech feature vector as such is exemplified by Mel-Frequency Cepstral Coefficient (MFCC). The MFCC is a method to generate a speech feature vector by taking a logarithm value of a mel-filter bank output for a speech spectrum in the frame t, and then applying Discrete Cosine Transform (DCT) to carry out cepstrum analysis for extracting a lower order component.

The speech feature to be used in the feature extracting unit 101 is not limited to the MFCC, and given speech features may be used.

(3) First Grammar Storage Unit 102

The first grammar storage unit 102 stores the grammar with which the phrase to be recognized is described. This grammar is stored in the form of grammar segments divided into one or more segments for each phrase segment. Examples of phrase segments and grammar segments will be described using FIG. 2 to FIG. 4.

(3-1) Phrase Segment

FIG. 2 is a table showing the phrases to be recognized and is an example of phrases to be recognized including seven sentences each having four phrase segments. In FIG. 2, the phrase segment which constitutes the phrase to be recognized is represented by Wn (n: word number).

(3-2) Grammar

Figure 3:
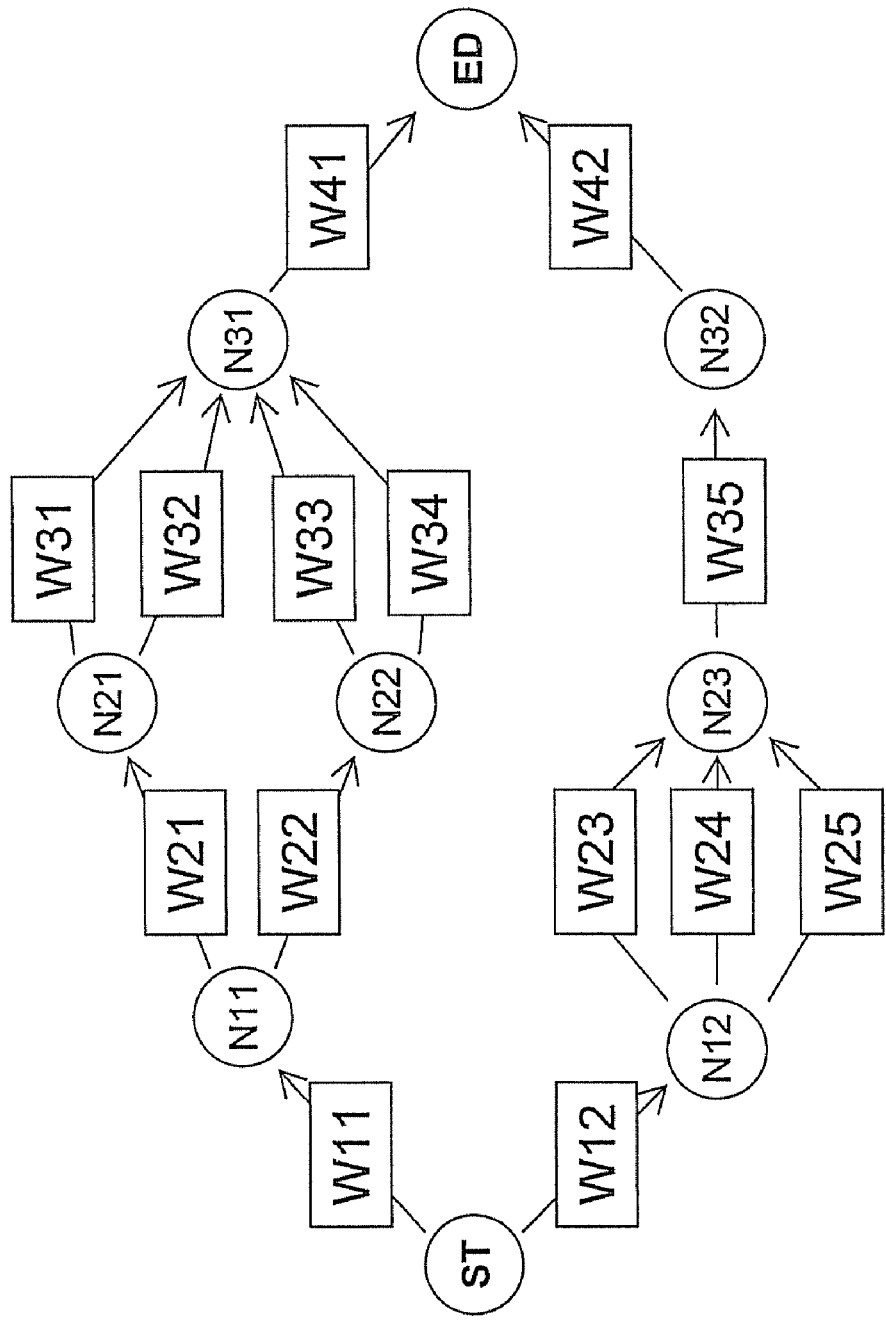
FIG. 3 is an example of grammar with which the phrase to be recognized is described.

FIG. 3 is an example of grammar with which the phrase to be recognized shown in FIG. 2 is described.

The grammar in FIG. 3 includes a node Nn (n: node number) and a directed ark connecting the nodes. ST and ED from among the nodes indicate a start and an end of the grammar. The respective ark is provided with the phrase segment Wn, and the phase to be recognized is obtained by following the ark extending from the start node ST to the end node ED. For example, in the grammar shown in FIG. 3, the phrase to be recognized "W11-W21-W31-W41" shown by the sentence No. 1 in FIG. 2 is obtained by starting from the start node ST and following through the ark provided with the words W11, W21, W31 and W41 to the end node ED.

(3-3) Grammar Segment

Figure 4:
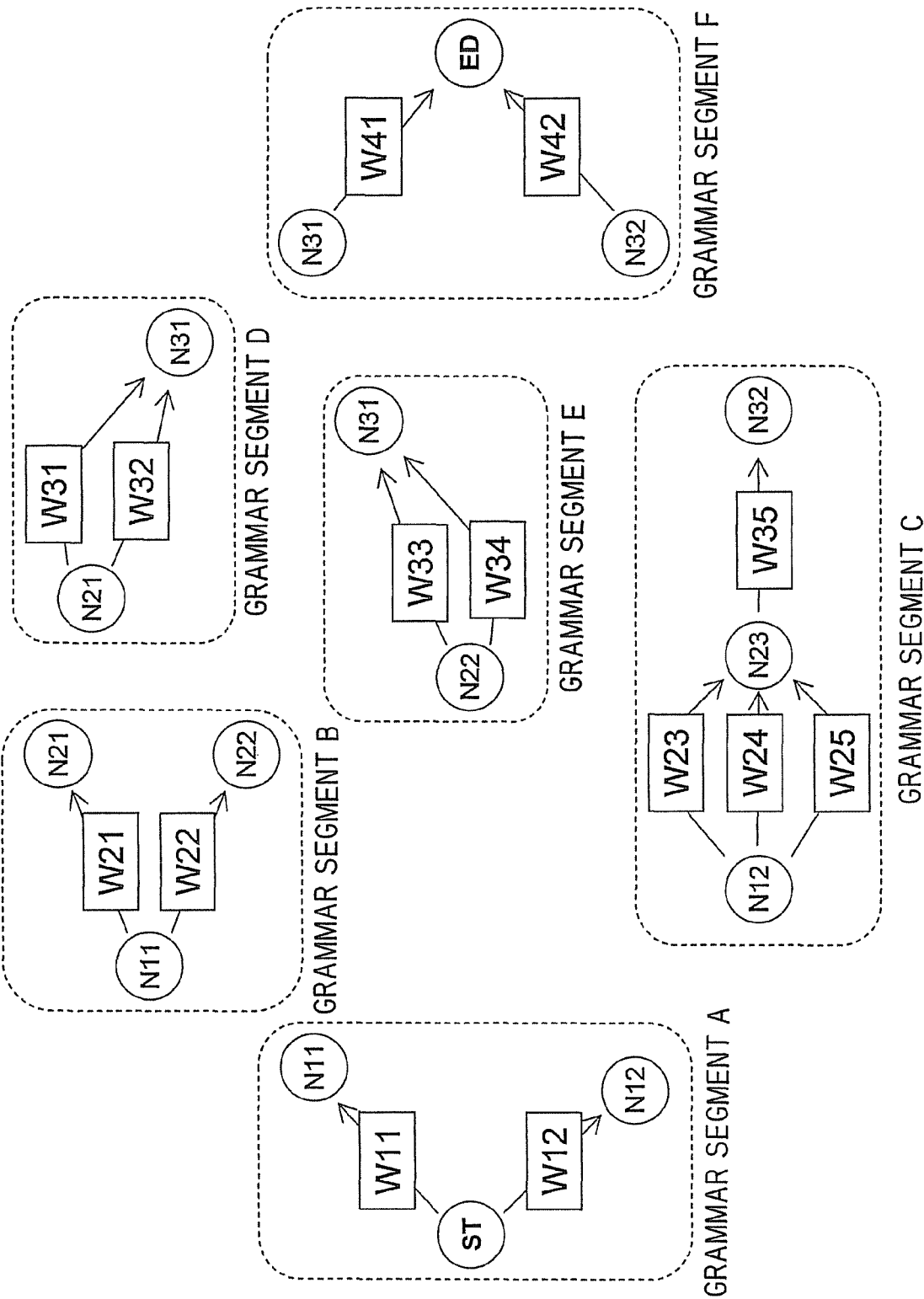
FIG. 4 is an example in which grammar which describes the phrases to be recognized is divided into one or more grammar segments.

FIG. 4 illustrates an example of grammar segments for phrase segments obtained by dividing a phrase expressed on the basis of the grammar in FIG. 3 into one or more phrase segments.

FIG. 4 is an example in which the grammar in FIG. 3 is divided into six grammar segments A to F. The grammar segments in FIG. 4 each are composed of the grammar in FIG. 3 and a part of the ark. For example, the grammar segment A in FIG. 4 is composed of the start node ST, arks W11 and W22 and nodes N11 and N12 which can reached via the arks from the grammar in FIG. 3.

The node N11 in the grammar segment A and the node N11 of the grammar segment B are the same node, which indicates that the grammar segment A and the grammar segment B can be connected via the node N11. In other words, the grammar segment B is a trailing grammar segment of the grammar segment A. Therefore, when the grammar reaches the node N11 from the node ST of the grammar segment A via the ark W11, it can further follow the ark derived from the node N11 of the grammar segment B. This relation is applied to other grammar segments as well, and the grammar is connected to the grammar segment and other grammar segments via the same node.

With such relation of connection, the grammar segments in FIG. 4 express the same vocabularies to be recognized as in the grammar shown in FIG. 3.

(3-4) Method of Dividing Grammar

FIG. 4 shows an example in which the grammar in FIG. 3 is divided into the six grammar segments. However, the dividing method may be selected as desired by a user of the speech recognition apparatus.

For example, the grammar may be divided by following a plurality of the arks from the beginning to the end of a grammar segment as in the case of the grammar segment C in FIG. 4.

Alternatively, the grammar may be divided so as to have a plurality of the prior grammar segments as a grammar segment F.

As shown in FIG. 4, the grammar may be divided into one or more given number of grammar segments in addition to division into the six grammar segments as the example shown in FIG. 4.

Moreover, an aggregation of nodes and arks which are not connected to each other, such as the grammar segment B and the grammar segment E in FIG. 4, may be determined as one grammar segment, or the grammar segment B may be further sectionalized into the two grammar segments.

(3-5) Stored Contents

The first grammar storage unit 102 stores all of one or more grammar segments shown in FIG. 4. In other words, all the grammar segments required for describing the phrase to be recognized is stored.

Therefore, the first grammar storage unit 102 must have a sufficient capacity for storing all the grammar segments. The storage capacity required in this case is in proportion to the size of the grammar, that is, the number of phrases to be recognized. When the number of phrases to be recognized is relatively large as addresses all Japan, the first grammar storage unit 102 is required to have a large capacity correspondingly.

As the storage device having a large capacity as such, a hard disk drive (HDD) is applicable. The storage device having the large capacity is not limited to the HDD, and other given speech recognition apparatus may be employed.

(4) Second Grammar Storage Unit 103

The second grammar storage unit 103 stores one or more grammar segments from among the grammar segments shown in FIG. 4.

From the reason described below, the capacity of the second grammar storage unit 103 may be relatively smaller than that of the first grammar storage unit 102. However, from the reason described below, the second grammar storage unit 103 preferably is a rapidly accessible storage unit. The read-out time for acquiring data from the second grammar storage unit 103 needs to be shorter than that from the first grammar storage unit 102.

As the rapidly accessible storage device, a Random Access Memory (RAM) is applicable. The rapidly accessible storage device is not limited to the RAM, and given storage device may be employed.

(5) Grammar Transfer Unit 104

The grammar transfer unit 104 transfers the grammar segments, which need be referred to in a decoding process carried out by the first decoder 107, described later, from the first grammar storage unit 102 to the second grammar storage unit 103.

The grammar segment which includes the start node of the grammar is transferred from the first grammar storage unit 102 to the second grammar storage unit 103 in advance in a stage before the decoding process in the first decoder 107 described later is started.

In the example shown in FIG. 4, the grammar segment A including the start node ST is transferred to the second grammar storage unit 103 in advance. The first decoder 107 refers the grammar segment including the start node from among the grammar segments stored in the second grammar storage unit 103 and starts the decoding process.

(6) Model Storage Unit 105

The model storage unit 105 stores a state transition model which expresses the speech features of a phrase or a phrase segment to be recognized. Hereinafter, the state transition model is simply expressed as "sound model".

As the sound model suitable for speech recognition, there is Hidden Markov Model (HMM). The HMM is defined by one or more state Si, an aggregation of initial states SS, an aggregation of final states SF, a transition probability Aji from a certain state Sj to a certain state Si, an output probability Bji(x) of a speech feature vector x in a transition pass from the certain state Sj to the certain state Si, and an initial probability PSi of the state Si. In this case, 1=<i=<NS and 1=<j=<NS are established and NS is a total number of the states which constitutes the HMM.

Figure 5:
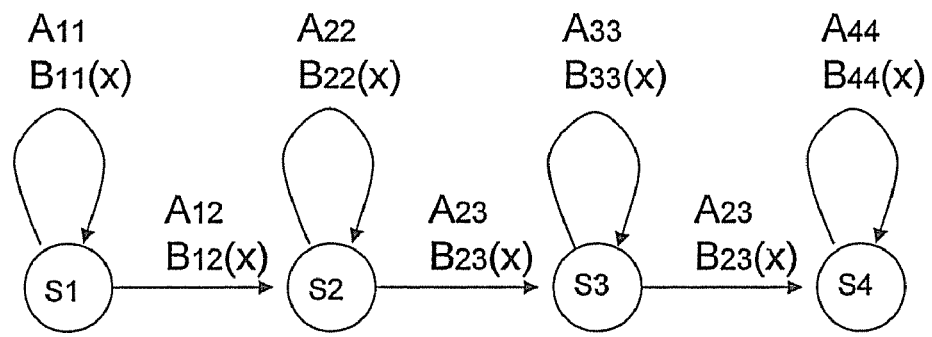
FIG. 5 is an example of HMM.

An example of HMM is shown in FIG. 5. FIG. 5 shows an example of HMM with the number of state NS=4, which is the HMM having a topology (structure) referred to as Left-to-Right type which is typically used in the speech recognition.

Figure 6:
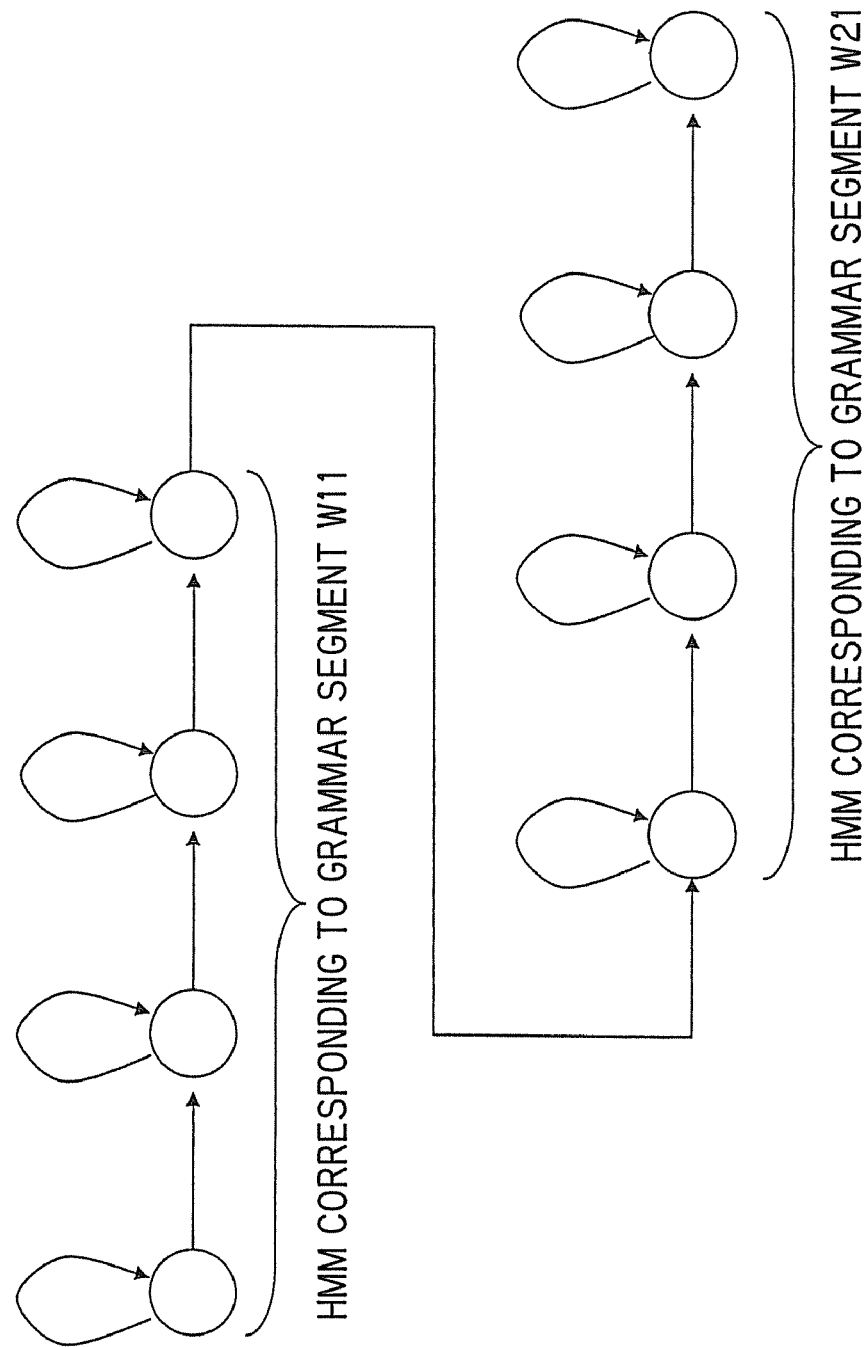
FIG. 6 is an example of the HMM to which a plurality of HMMs which corresponds to the phrase segments are connected.

As the features of HMM, the HMM of the longer phrases is obtained by connecting a plurality of the HMMs which correspond to a certain phrase segment. For example, as shown in FIG. 6, a HMM of a phrase "W11-W21" is obtained by connecting two HMM corresponding to the phrase segment W11 and the phrase segment W21. Hereinafter, description will be given with the premise that the HMM shown in FIG. 5 is used as the sound model.

Here, the "state transition model (sound model)" expresses a time-series change of the speech feature, and the "respective states" in the state transition model express the speech feature at a certain time point in the time-series change. As shown in FIG. 5, the time-series change of the speech feature is expressed by the states being connected by transition (arrows) as the entire sound model. More specifically, the "respective states" output "output probability" of the speech feature at a certain time point and "forward probability" is calculated by the following expressions (1) to (3) using the output probability.

Figure 7:
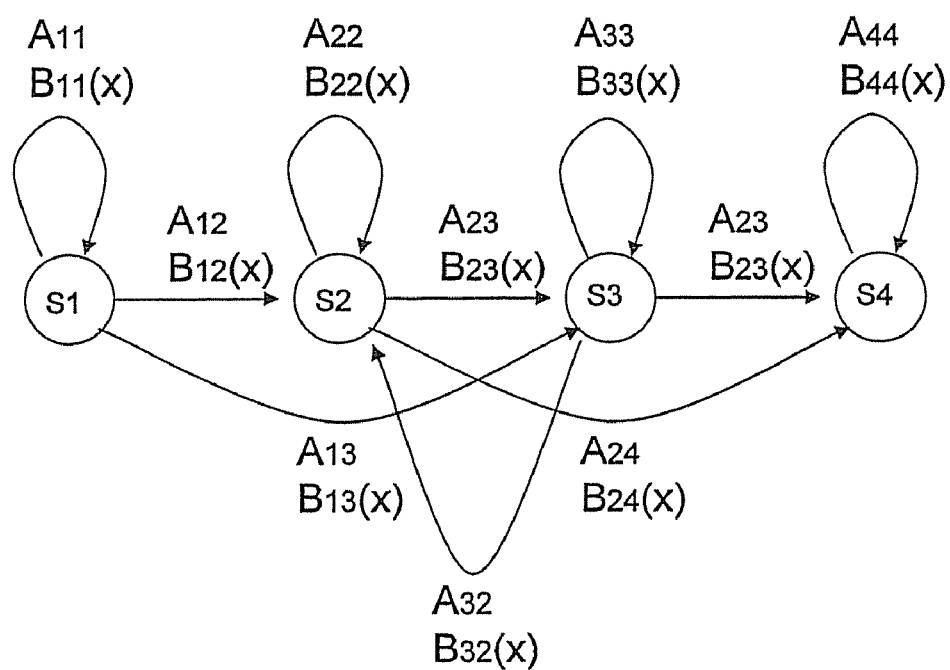
FIG. 7 is an example of the HMM having a number of transitions.

Any HMMs including the example in FIG. 5 are used as the sound mode. For example, the HMM having a number of transition passes as the HMM in FIG. 7 is used. The sound model is not limited to the HMM, and a given model having the state transition as a time-series template model is employed.

(7) First Decoder 107

The first decoder 107 carries out decoding of the speech feature sequences and sound models.

(7-1) Decoding Method

A decoding method will be described below.

(7-1-1) Calculation of the Output Probability from the HMM

The output probability P(X|w) from the HMM corresponding to a certain phrase w to be recognized is calculated for the speech feature sequence X. Here, 1=<w=<W is established and W is a total number of the phrases to be recognized. When the expression P(X|w) is simplified as P(X), P(X) is calculated by the expression (1), the expression (2) and the expression (3).

$$P(X) = \max i(\alpha(i, T)) \text{ (where } Si \subset SF) \quad (1)$$

$$\alpha(i, 0) = PSi \text{ (where } Si \subset SS) \quad (2)$$

$$\alpha(i, t) = \max\_i(Aji * Bji(x(t)) * \alpha(j, t-1)) \quad (3)$$

where α(i, t) is a forward probability of transition from the initial state of HMM to the state Si of the HMM in $t^{th}$ frame.

In HMM, since there exist a plurality of transition paths from the initial state to the state Si in the $t^{th}$ frame, the forward probability is calculated as the total sum of the forward probabilities respectively in the plurality of transition path by right. However, in the expression (3), the transition path which provides the highest forward probability is selected from the plurality of transition paths, and the forward probability is determined as the forward probability in the state Si in the $t^{th}$ frame. This method is referred to as Viterbi method. The Viterbi method is known in that it is preferable approximation of the method which takes the total sum of the forward probabilities of the plurality of transition paths in the field of the speech recognition.

The first decoder 107 calculates the output probability (P(X|w) of the phrase w to be recognized for the speech feature sequence X by the forward probability of the state Si which is Si ⊂ SF in the frame No. T, as shown in expression (1).

Also, the output probability P(X|w) is calculated for the plurality of phrases w to be recognized, and the phrase w to be recognized which provides the highest output probability is outputted as the result of decoding.

(7-1-2) Method of Referring to Variables

Variables which depend on the HMM in the expression (1), the expression (2) and the expression (3), that is, the aggregation SS of the initial states, the aggregations SF of the final states, the transition probability Aji, the output probability Bji and the initial probability (PSi are provided from the HMM corresponding to the phrase w to be recognized.

The variables are obtained by referring to the phrase to be recognized and the phrase segments thereof described in one or more grammar segments stored in the second grammar storage unit 103 and referring to the HMMs corresponding to the phrase to be recognized and the phrase segments stored in the model storage unit 105.

Therefore, in order to carry out the process in the first decoder 107 with sufficient rapidity, reference of the phrase to be recognized and the phrase segments should be carried out rapidly. Therefore, it is necessary to be able to refer to one or more grammar segments stored in the second grammar storage unit 103 rapidly. In other words, the second grammar storage unit 103 is preferably rapidly accessible.

As shown in the expression (3), the forward probability α(i, t) of the state Si of the HMM for the speech feature sequence X is calculated by a recurrence formula according to the increase of the frame number t.

Therefore, not all the grammar segments are stored in the second grammar storage unit 103, and even when only the phrase segments of the phrase to be recognized can be referred to, calculation of the forward probability on the basis of the expression (3) may be started.

For example, when using the grammar segments shown in FIG. 4, the grammar segment A including the start node ST from among the grammar segments in FIG. 4 is stored in the second grammar storage unit 103, calculation of the forward probability on the basis of the expression (3) is started by referring to the HMMs corresponding to the phrase segments W11 and W12 described in the grammar segment A from the model storage unit 105.

(7-2) Method of Transfer

In order to enable the above-described referring process, the grammar transfer unit 104 transfers the grammar segment including the start node in advance from the first grammar storage unit 102 to the second grammar storage unit 103.

Then, the grammar transfer unit 104 transfers the trailing grammar segment from the first grammar storage unit 102 to the second grammar storage unit 103 according to the progress of the process in the first decoder 107.

The method of transfer will be described referring to FIG. 4.

First of all, calculation of the forward probability by the expression (3) for the HMM corresponding to the phrase segment W11 described in the grammar segment A in FIG. 4 makes progress.

Then, when the progress is made, the forward probability of the final state of the HMM corresponding to the phrase segment W11 is calculated.

Then, since the first decoder 107 needs to refer to the HMMs corresponding to the trailing phrase segments W21 and W22 of the phrase segment W11 for further continuing the calculation of the forward probability, the grammar transfer unit 104 transfers the grammar segment B to the second grammar storage unit 103.

Subsequently, the first decoder 107 refers to the trailing phrase segments W21 and W22 described in the grammar segment B as the transferred training grammar segment, and then refers to the HMMs corresponding thereto from the model storage unit 105, so that the decoding process on the basis of the expression (3) is continued.

In this manner, the grammar transfer unit 104 transfers the required grammar segments on the basis of the progress of the process in the first decoder 107, and hence the number of the grammar segments to be stored in the second grammar storage unit 103 is efficiently restricted. For example, in order to calculate the output probability of the phrases to be recognized "W11-W21-W31-W41" when referring to the grammar segments shown in FIG. 4, four grammar segments of A, B, D and F must only be stored in the second grammar storage unit 103. At this time, by transferring the grammar segments including the phrase segments trailing the phrase segments which provide the higher forward probability than other phrase segments to the corresponding phrase segments by priority, efficient selection of the grammar segment to be transfer is achieved. Consequently, the capacity of the second grammar storage unit 103 is reduced in comparison with the capacity of the first grammar storage unit 102.

(7-3) Problems

Figure 8:
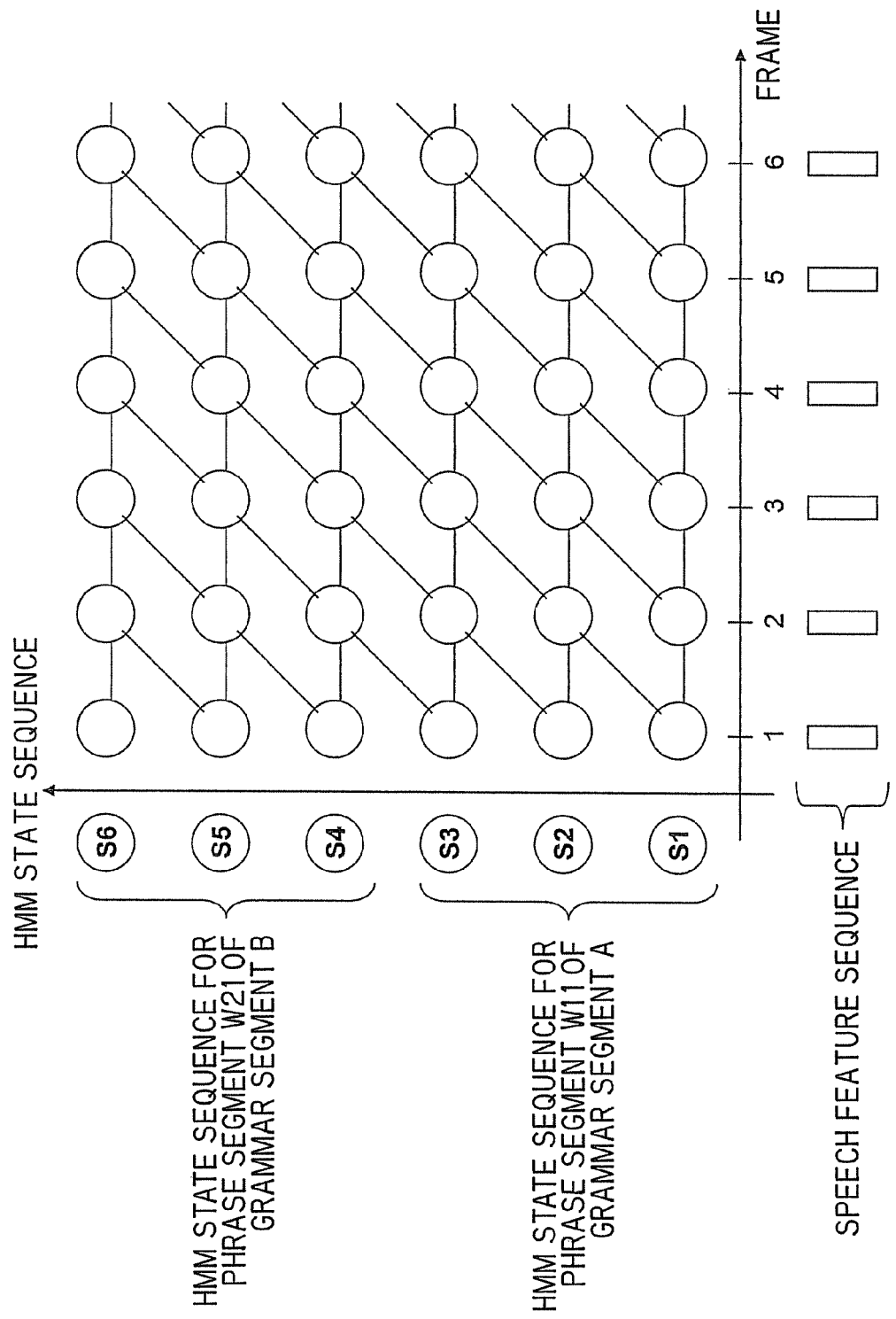
FIG. 8 is a drawing explaining decoding of HMM state sequences corresponding to the plurality of phrase segments.
Figure 9:
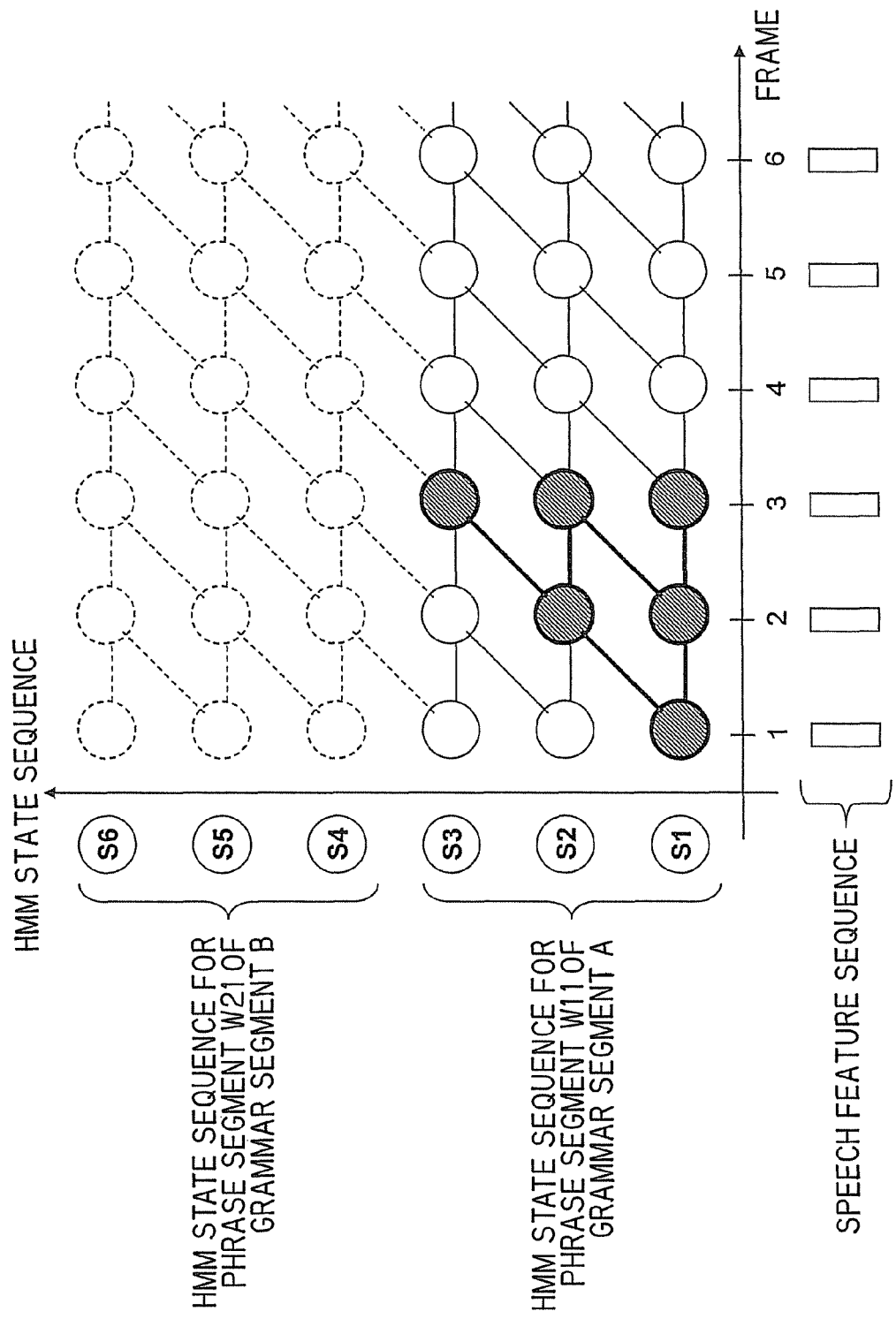
FIG. 9 is a drawing for explaining a decoding process carried out by a first decoder according to a first embodiment.
Figure 10:
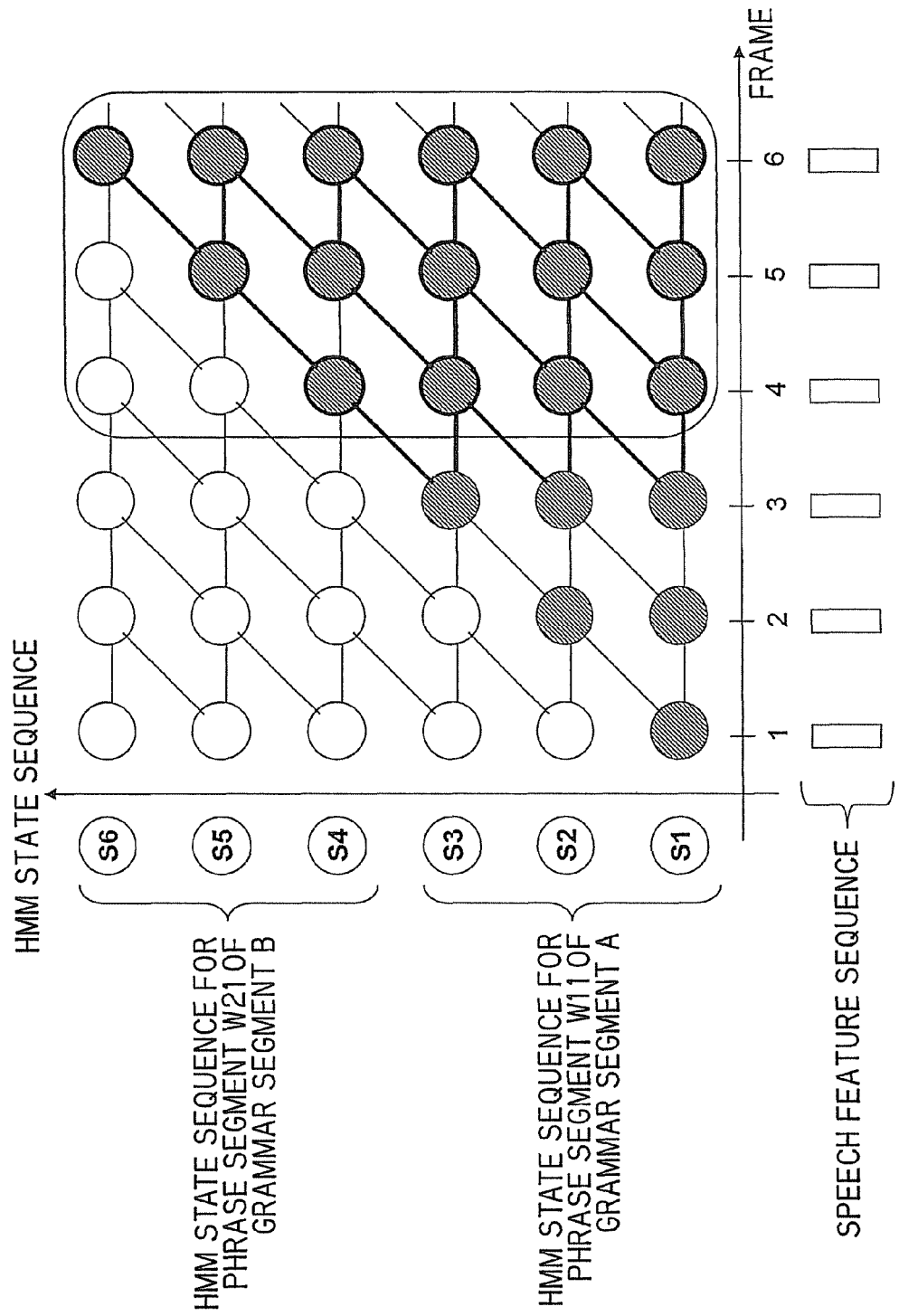
FIG. 10 is a drawing showing a case in which the decoding process in the related art is carried out.

However, when only the first decoder 107 is used as in the related art, there arises a problem that the execution of the process is delayed by the time corresponding to the transfer time required for transferring the grammar segment carried out by the grammar transfer unit 104. Referring now to FIGS. 8 to 10, this problem will be described.

FIG. 8 shows a HMM state sequence whose forward probability should be calculated in calculation of the forward probability for the phase "W11-W21" which is obtained by connecting the phrase segment W11 described in the grammar segment A and the phrase segment W21 described in the grammar segment B from among the grammar expressed by the aggregation of the grammar segments and the phase to be recognized shown in FIG. 4. The vertical axis in FIG. 8 shows the HMM state sequences S1 to D3 corresponding to the phrase segment W11 and the HMM state sequences S4 to S6 corresponding to the phrase segment W21. The lateral axis in the FIG. 8 shows the speech feature sequences for the respective frames. The intersections of the vertical axis and the lateral axis in FIG. 8 indicate the state Si of the HMM in the frame t, and it is necessary to calculate the forward probabilities $\alpha(i, t)$ for these intersections. The arks between the intersections indicate the transition paths between the states of the HMMs.

The first decoder 107 proceeds the decoding process by calculating the forward probabilities of the respective intersections on the basis of the expression (3). In the initial state, only the grammar segment A is stored in the second grammar storage unit 103. Therefore, only the HMM state sequences S1 to S3 corresponding to the phrase segment W11 described in the grammar segment A can be referred to. This state is shown in FIG. 9.

In FIG. 9, the HMM state sequences corresponding to the phrase segment W21 described in the grammar segment B which are not transferred to the second grammar storage unit 103 yet are shown by broken lines. The first decoder 107 first of all calculates the forward probability of the HMM state sequences corresponding to the phrase segment W11. In the example shown in FIG. 9, calculation is completed until the forward probability $\alpha(3, 3)$ of the final state S3 of the phrase segment W11 at the time point of the third frame (t=3). In FIG. 9, the result of calculation of the forward probability is shown as hatched points. In order to further continue the calculation of the forward probability, it is necessary to refer to the HMM state sequences corresponding to the phrase segment W21 described in the grammar segment B. Therefore, at this time point, the grammar transfer unit 104 transfers the grammar segment B from the first grammar storage unit 102 to the second grammar storage unit 103.

Here, when using only the first decoder 107, the decoding process in the first decoder 107 is restarted at the time point when the transfer of the grammar segment is completed. In other words, as shown in FIG. 10 in a frame line, the forward probabilities for the HMM state sequences S1 to S6 corresponding to the phrase segment W11 and the phrase segment W21 are calculated for the speech feature sequences of the frames from the fourth frame (t=4) onward. At this time, the calculation of the forward probability is stopped once until the transfer of the grammar segment carried out by the grammar transfer unit 104 is completed. Therefore, the process in the first decoder 107 is delayed by the time corresponding to the transfer time required for transferring the grammar segment carried out by the grammar transfer unit 104, which corresponds to the delay of the process of the speech recognition apparatus as a whole.

When the time required for carrying out the decoding process, that is, the calculation of the forward probability for the $i^{th}$ state to the $j^{th}$ state (i<j) from among the HMM state sequences between the $t1^{st}$ frame and the $t2^{nd}$ frame (t1<t2) is expressed as D(t1:t2, Si:Sj), the time D(1:6, S1:S6) required for calculating the forward probability of the HMM state sequences S1 to S6 until the $6^{th}$ frame (t=6) in the decoding process shown in FIGS. 8 to 10 is given by the following expression (4);

$$D(1:6, S1:S6) = D1(1:3, S1:S3) + Dt(B) + D1(4:6, S1:S6) \quad (4),$$

where Dt(B) is a transfer waiting time required for transferring the grammar segment B in the grammar transfer unit 104, and D1( ) is a time required for calculating the forward probability by the first decoder 107. In general, when transferring data between two different storage device, a certain length of transfer waiting time is generated.

When the large-capacity storage device which enables only slow access is used as the first grammar storage unit 102, a waiting time for reading out the grammar segment from the first grammar storage unit 102 is also generated when starting the transfer of the grammar segment.

The time Dt(g) for transferring a given grammar segment g is increased according to these factors. Consequently, even when speeding up of the processing time required for calculating the forward probability by the rapidly accessible second grammar storage unit 103 is achieved, the time required for transferring the grammar segment is increased and, as a result, there arises a problem that the time D(t1:t2, Si:Sj) required for calculating the forward probability is increased.

(7-4) Means for Solving the Problem

In view of the problem described above, in the first embodiment, the second decoder 108 and the recognition control unit 106, described later, are provided, and the second decoder 108 is activated in parallel with the transfer of the grammar segment, so that the problem is solved. The operation for solving the problem will be described below.

(8) Second Decoder 108

Figure 11:
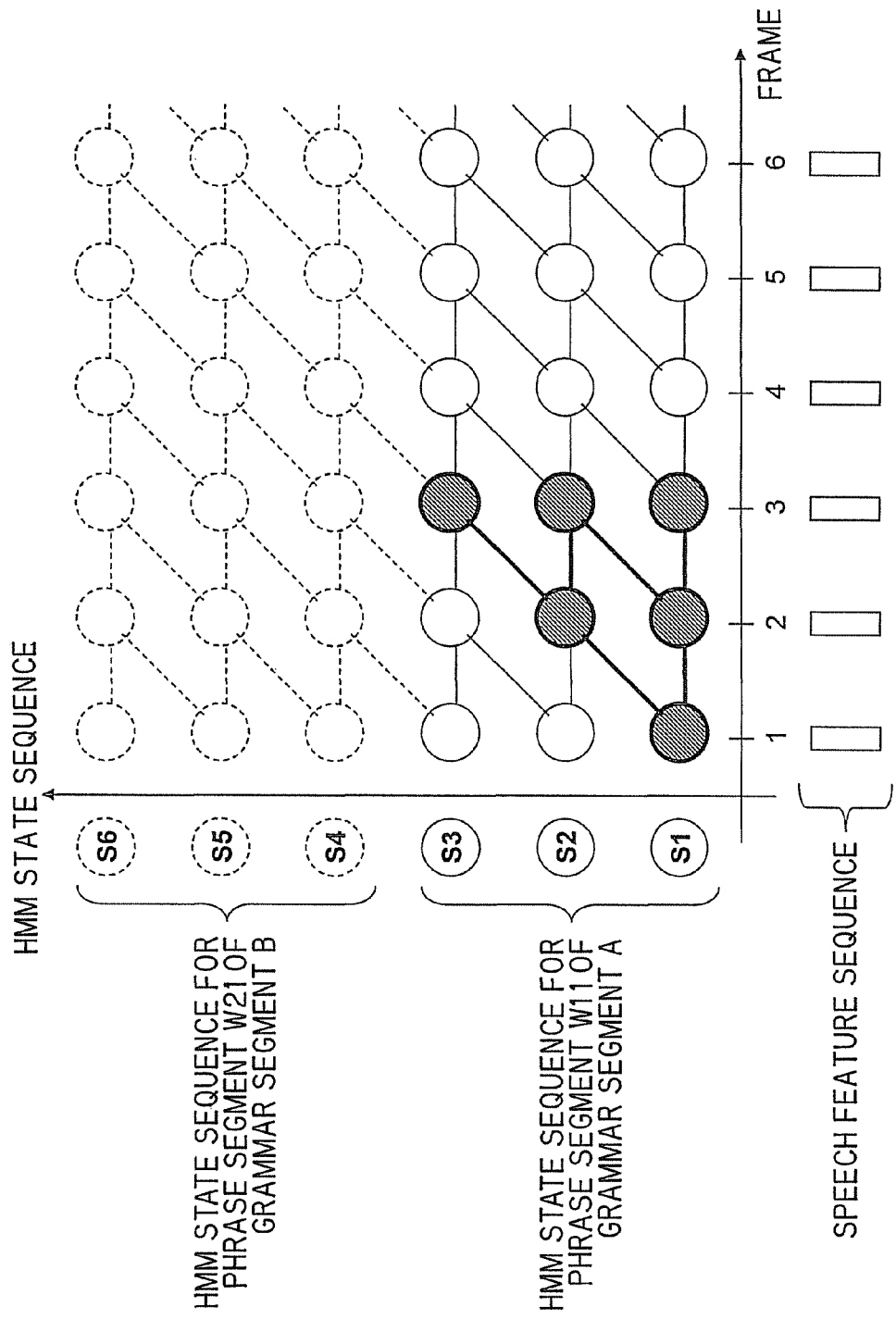
FIG. 11 is a drawing for explaining the decoding process carried out by the first decoder.
Figure 12:
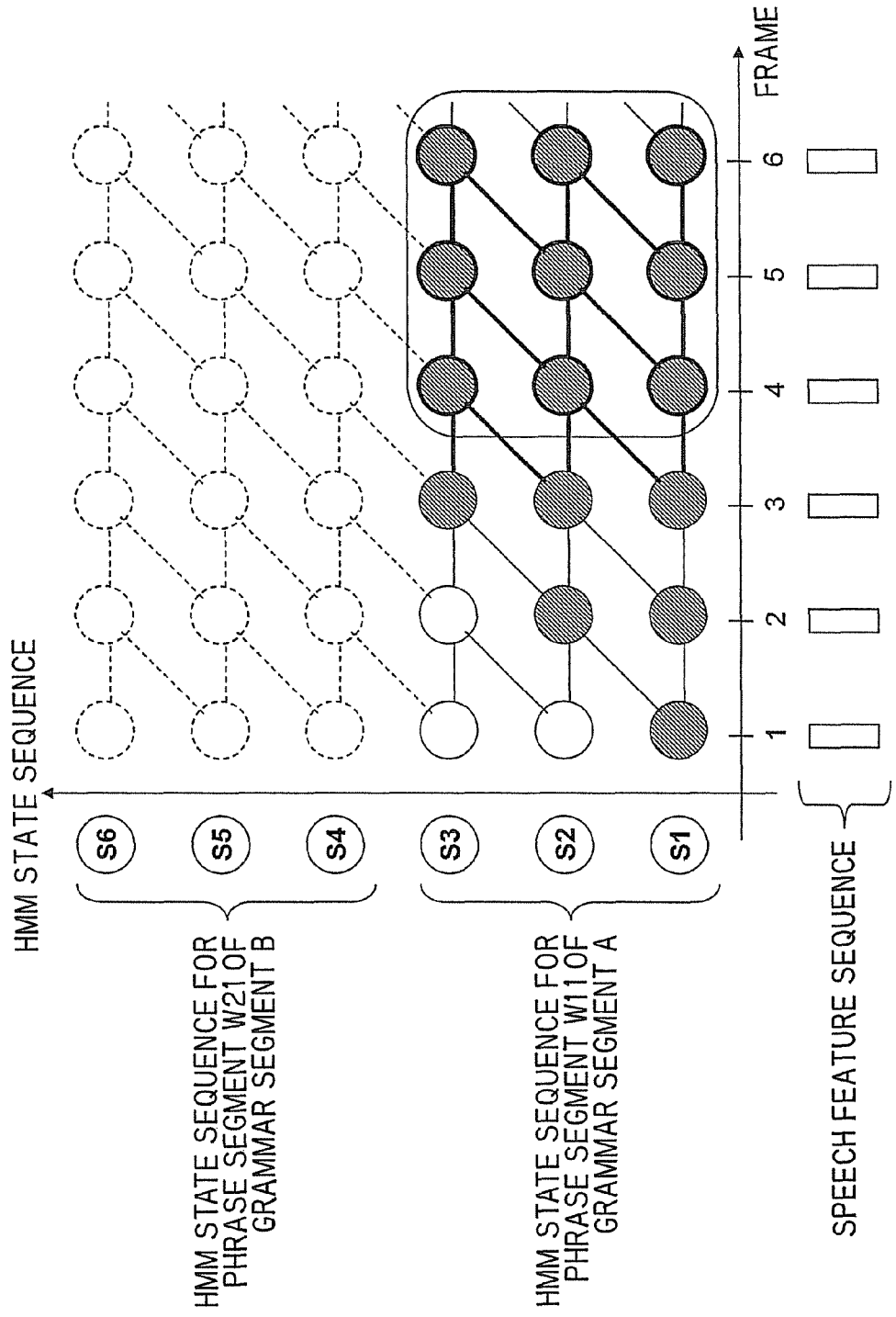
FIG. 12 is a drawing for explaining the decoding process carried out by a second decoder.
Figure 13:
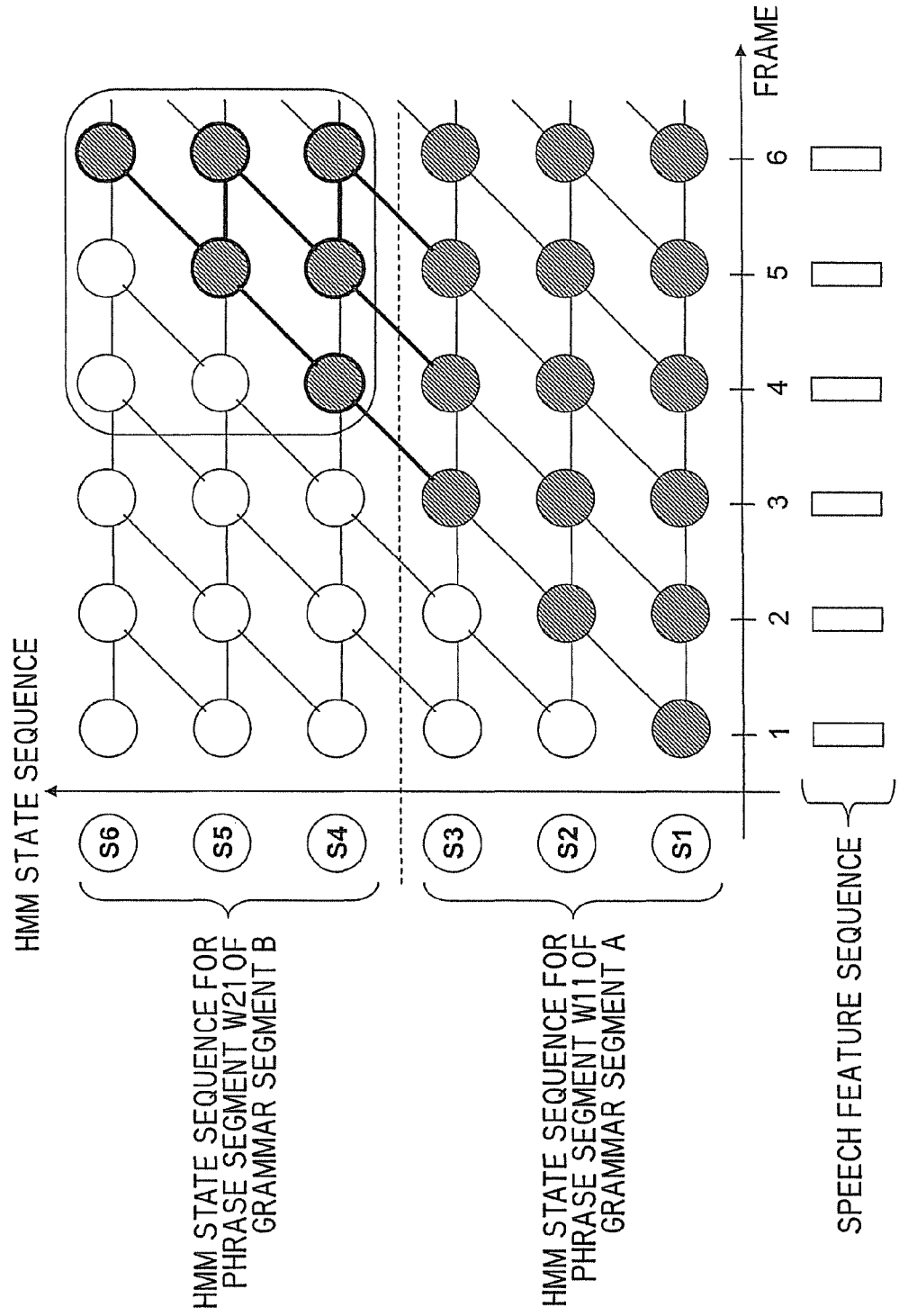
FIG. 13 is a drawing for explaining the decoding process carried out by the first decoder.

The second decoder 108 decodes the speech feature sequences and the sound models on the basis of the expression (1), the expression (2) and the expression (3) as in the case of the first decoder 107. However, the second decoder 108 carries out the decoding process in parallel to the transfer of the grammar segment while the grammar transfer unit 104 transfers the grammar segment. The state of this process will be described referring to FIGS. 11 to 13. FIGS. 11 to 13 show the state of calculation of the forward probability carried out by the first decoder 107 and the second decoder 108 as in FIGS. 8 to 10.

(8-1) The Process during Transfer of the Grammar Segment

FIG. 11 shows a state in which calculation is completed until the forward probability α(3, 3) of the final state S3 of the phrase segment W11 at the time point of the third frame (t=3) as in FIG. 9. The calculation of the forward probability shown in FIG. 11 is carried out by the first decoder 107 as described above.

From this time point onward, the grammar transfer unit 104 starts transfer of the grammar segment B from the first grammar storage unit 102 to the second grammar storage unit 103.

In parallel to the transfer of the grammar segment, the second decoder 108 carries out the decoding process for the grammar segment A stored already in the second grammar storage unit 103, that is, calculates the forward probability of the HMM state sequence corresponding to the phrase segment W11 described in the grammar segment A. This state is shown in FIG. 12.

FIG. 12 shows the state of calculation of the forward probability carried out by the second decoder 108 during the transfer of the grammar segment carried out by the grammar transfer unit 104. As shown in an area in a frame line in FIG. 12, the second decoder 108 calculates the forward probabilities of the HMM state sequences S1 to S3 corresponding to the phrase segment W11 described in grammar segment A for the speech feature sequences from the fourth frame (t=4) to the sixth frame (t=6).

The calculation of the forward probability in the second decoder 108 continues until the transfer of the grammar segment carried out by the grammar transfer unit 104 is completed. Here, as shown in FIG. 12, the transfer of the grammar segment carried out by the grammar transfer unit 104 is considered to be completed at the time point when the calculation of the forward probability of the speech feature in the sixth frame (t=6) in the second decoder 108 is completed.

(8-2) Processing after Transfer of the Grammar Segment

At the time point when the transfer of the grammar segment is completed, the process carried out by the second decoder 108 is ended, and the decoding process carried out by the first decoder 107 is restarted.

At this time, a range of calculation of the forward probability carried out by the first decoder 107 is a range indicated by a frame line in FIG. 13. In other words, the forward probabilities of the HMM state sequences S4 to S6 corresponding to the phrase segment W21 described in the newly transferred grammar segment B are calculated for the speech feature sequences from the fourth frame (t=4) to the sixth frame (t=6). The range of calculating the forward probability indicated by the frame line in FIG. 13 is further restricted in comparison with FIG. 10 which shows a case in which the forward probability is calculated only by the first decoder 107 without using the second decoder 108.

Accordingly, the time D(1:6, S1:S6) required for calculating the forward probabilities of the HMM state sequences S1 to S6 until the sixth frame (t=6) is reduced in comparison with the case of the expression (4). More specifically, the time D(1:6, S1:S6) required for calculating the forward probability in the case of using the second decoder 108 is given by the following expression (5);

$$D(1:6,S1:S6)=D1(1:3,S1:S3)+Dt(B)+D1(4:6,S4:S6) \quad (5),$$

where Dt(B) required for transferring the grammar segment B is equal to the time required for calculating the forward probabilities of the HMM state sequences S1 to S3 for the speech feature sequences from the fourth frame (t=4) to the sixth frame (t=6) in the second decoder 108. In other words, Dt(B)=D2(4:6, S1:S3) is established. Therefore, the expression (5) can be modified to the expression (6);

$$D(1:6,S1:S6)=D1(1:3,S1:S3)+D2(4:6,S1:S3)+D1(4:6,S4:S6) \quad (6)$$

There is no difference in time for calculating the forward probability between the first decoder 107 and the second decoder 108. In other words, D2(4:6, S1:S3)=D1(4:6, S1:S3) is established. Therefore, the expression (6) can be modified to the expression (7);

$$D(1:6,S1:S6)=D1(1:3,S1:S3)+D1(4:6,S1:S3)+D1(4:6,S4:S6)=D1(1:3,S:S3)+D1(4:6,S1:S3) \quad (7).$$

(8-3) Effects of the Parallel Process

When the expression (4) and the expression (7) are compared, the expression (7) is equal to the expression (4) when the time required for transferring the grammar segment becomes Dt(B)=0, and the left side is smaller than the expression (4).

In other words, the influence of the time required for the transfer of the grammar segment B is eliminated from the time D required for calculating the forward probability by carrying out the process by the second decoder 108 in parallel to the transfer of the grammar segment.

Consequently, the rapid decoding process is carried out without affected by the time required for the transfer of the grammar segment from the first grammar storage unit 102 to the second grammar storage unit 103 carried out by the grammar transfer unit 104 while restricting increase in cost by reducing the capacity of the second grammar storage unit 103.

(9) Recognition Control Unit 106

The recognition control unit 106 monitors the state of transfer of the grammar segment carried out by the grammar transfer unit 104, and switches the operation between the first decoder 107 and the second decoder 108 according to the state of transfer.

In other words, when the grammar transfer unit 104 starts the transfer of the grammar segment according to the progress of the decoding process carried out by the first decoder 107, the recognition control unit 106 switches the operation from the first decoder 107 to the second decoder 108 to carry out the decoding operation by the second decoder 108 in parallel to the transfer of the grammar segment.

Upon completion of the transfer of the grammar segment carried out by the grammar transfer unit 104, the recognition control unit 106 switches the operation from the second decoder 108 to the first decoder 107 to restart the process carried out by the first decoder 107.

(10) Operation

Figure 14:
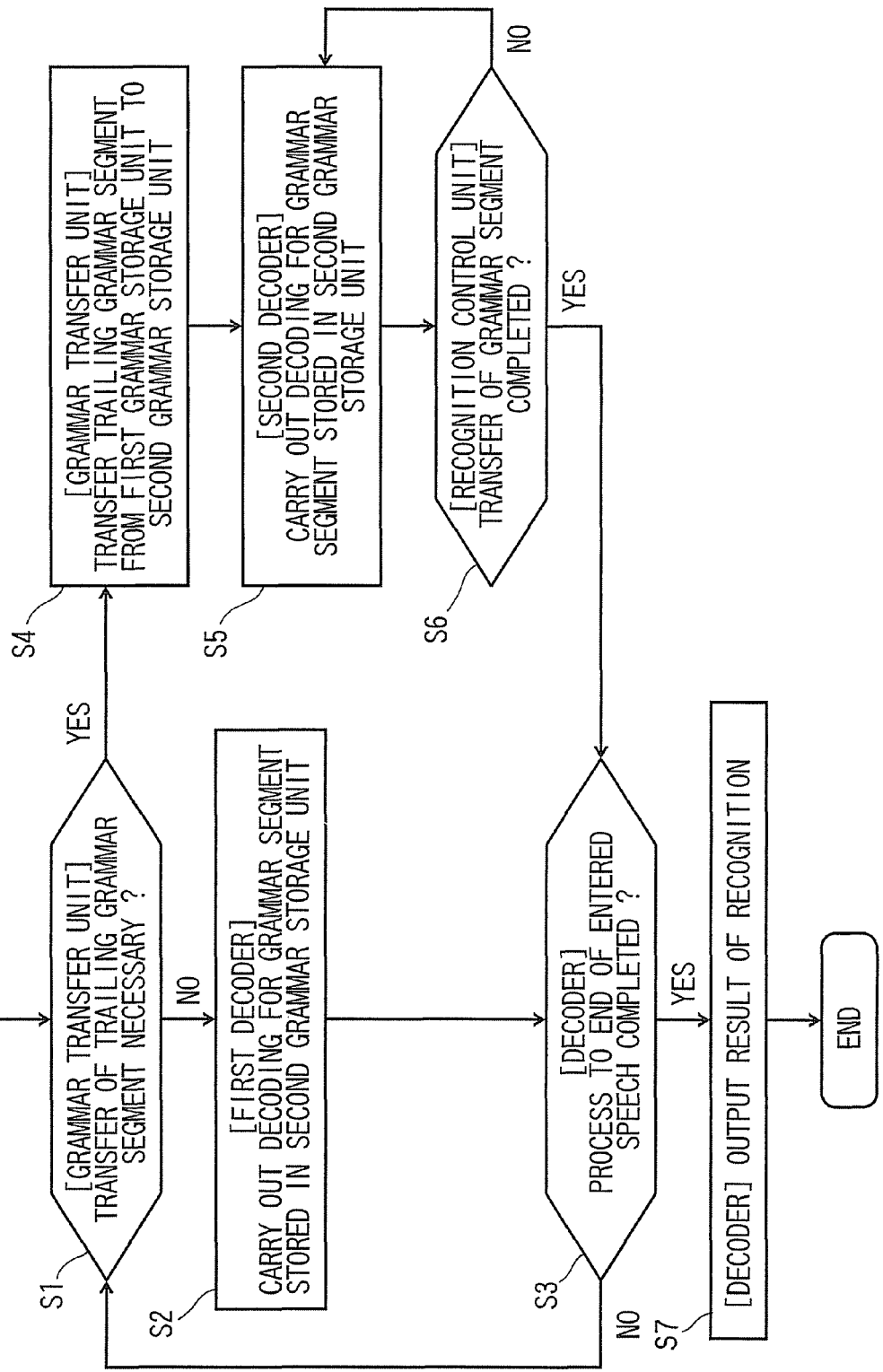
FIG. 14 is a flowchart of the first embodiment.

Referring now to FIG. 14, operation of the first embodiment will be described. FIG. 14 is a flowchart showing an example of the operation of the first embodiment.

Since the operation flow of the feature extracting unit 101 is apparent for those skilled in the art, the description thereof is omitted in this flowchart. The operation on the basis of the flowchart in FIG. 14 will be described step by step (Operation Steps S1 to S7) below.

(S1): The grammar transfer unit 104 determines whether transfer of the grammar segment is necessary or not on the basis of the progress of the decoding process carried out by the first decoder 107. When the transfer of the grammar segment is necessary, the procedure goes to Step S4. If not, the procedure goes to Step S2.

(S2): The first decoder 107 refers to the grammar segment stored in the second grammar storage unit 103, and carries out the decoding process.

(S3): When the decoding process carried out by the first decoder 107 or the second decoder 108 has completed for the speech feature corresponding to the end of the entered speech, the procedure goes to Step S7. If not, the procedure goes to Step S1 to continue the decoding process.

(S4): The grammar transfer unit 104 transfers the grammar segment required by the first decoder 107 from the first grammar storage unit 102 to the second grammar storage unit 103.

(S5): The second decoder 108 refers to the grammar segment stored in the second grammar storage unit 103, and carries out the decoding process in parallel to the transfer of the grammar segment carried out by the grammar transfer unit 104.

(S6): The recognition control unit 106 monitors the state of transfer of the grammar segment carried out by the grammar transfer unit 104. When the transfer of the grammar segment is completed, the procedure goes to Step S3. When the transfer of the grammar segment is not completed, the procedure goes to Step S5 where the second decoder 108 continues the process.

(S7): The first decoder 107 or the second decoder 108 outputs the phrase to be recognized which provides the highest forward probability as a result of recognition.

(11) Advantages

In this manner, in the first embodiment, the rapid decoding process is achieved while restraining increase in cost of the speech recognition apparatus by reducing the capacity of the second grammar storage unit 103 without being affected by the transfer waiting time for waiting the transfer of the grammar segment from the first grammar storage unit 102 to the second grammar storage unit 103 carried out by the grammar transfer unit 104.

(12) Modifications

The invention is not limited to the first embodiment as is, and modifications of the components may be made without departing from the scope of the invention in the stage of implementation. The invention may be modified in various manners by combining the plurality of components disclosed in the embodiment as needed. For example, some components may be eliminated from all the components disclosed in the embodiment. Furthermore, components in different embodiments may be combined as needed.

For example, in the embodiment shown above, the two decoders, that is, the first decoder 107 and the second decoder 108 are provided as the decoders, and the operation of these decoders is switched by the recognition control unit 106.

However, a configuration in which the first decoder 107 and the second decoder 108 are replaced by a single decoder, and the decoder switches the internal process so that the operation of the decoder becomes equivalent to the operation of the first decoder 107 or the second decoder 108 according to the instruction from the recognition control unit 106 is also applicable.

Second Embodiment

Referring now to FIG. 11, FIG. 12 and FIGS. 15 to 18, the speech recognition apparatus according to a second embodiment will be described.

(1) Characteristics of Second Embodiment

According to the expression (3) for calculating the forward probability carried out by the first decoder 107 and the second decoder 108 in the first embodiment, the calculation of the forward probability in the $t^{th}$ frame depends only on the forward probability in the previous frame t−1 and the speech feature x(t) in the frame t. Therefore, when calculating the forward probability α(i, t) in the $t^{th}$ frame in the decoding process, only the forward probability α(i, t−1) (1=<i=<NS) in the t−$1^{st}$ frame is stored to calculate the forward probability for the speech feature x(t) in the $t^{th}$ frame.

In this manner, the amount of memory required for storing the given forward probabilities is significantly reduced by storing only the forward probability α(i, t−1) in the t−$1^{st}$ frame and forgetting other calculated forward probabilities in the calculation of the forward probability in the $t^{th}$ frame.

Also, the amount of memory required for storing the given speech feature is significantly reduced by referring only to the speech feature x(t) in the $t^{th}$ frame and forgetting the speech feature sequence in the frames before the $t^{th}$ frame.

As described below, the second embodiment has an advantage that the amount of memory required for storing the forward probabilities and the speech feature sequences in the process of the calculation of the forward probability carried out by the decoder is reduced significantly.

(2) Configuration of the Speech Recognition Apparatus

Figure 15:
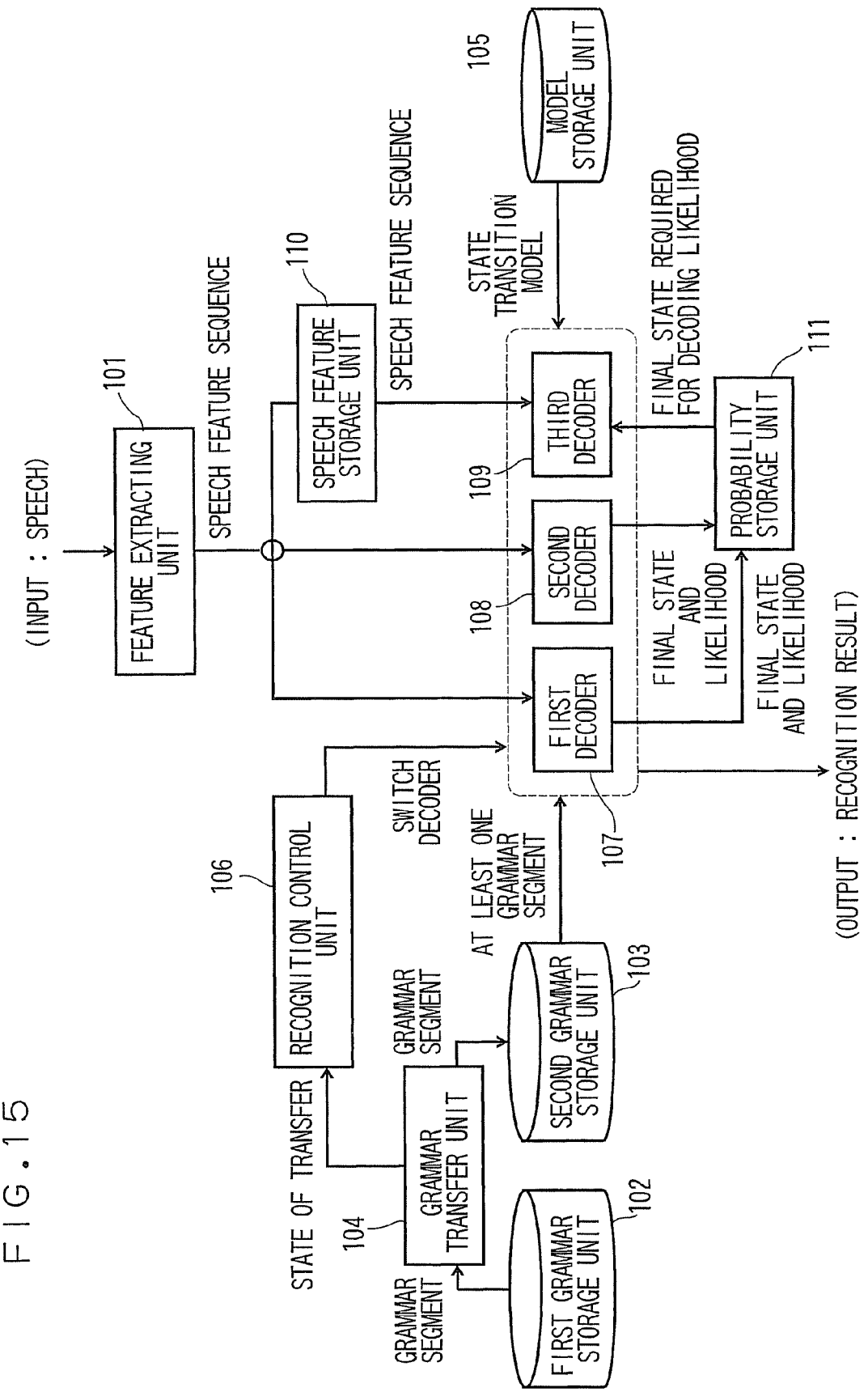
FIG. 15 is a block diagram showing an example of configuration of a speech recognition apparatus according to a second embodiment.

FIG. 15 is a block diagram showing an example of configuration of the speech recognition apparatus according to the second embodiment.

The speech recognition apparatus has substantially the same configuration as the block diagram shown in FIG. 1 showing the first embodiment, and includes the feature extracting unit 101, the first grammar storage unit 102, the second grammar storage unit 103, the grammar transfer unit 104, the model storage unit 105, the recognition control unit 106, the first decoder 107 and the second decoder 108. The second embodiment further includes a third decoder 109, a speech feature storage unit 110 and a probability storage unit 111.

In the following description, only those different from the first embodiment will be described.

(3) Speech Feature Storage Unit 110

Figure 16:
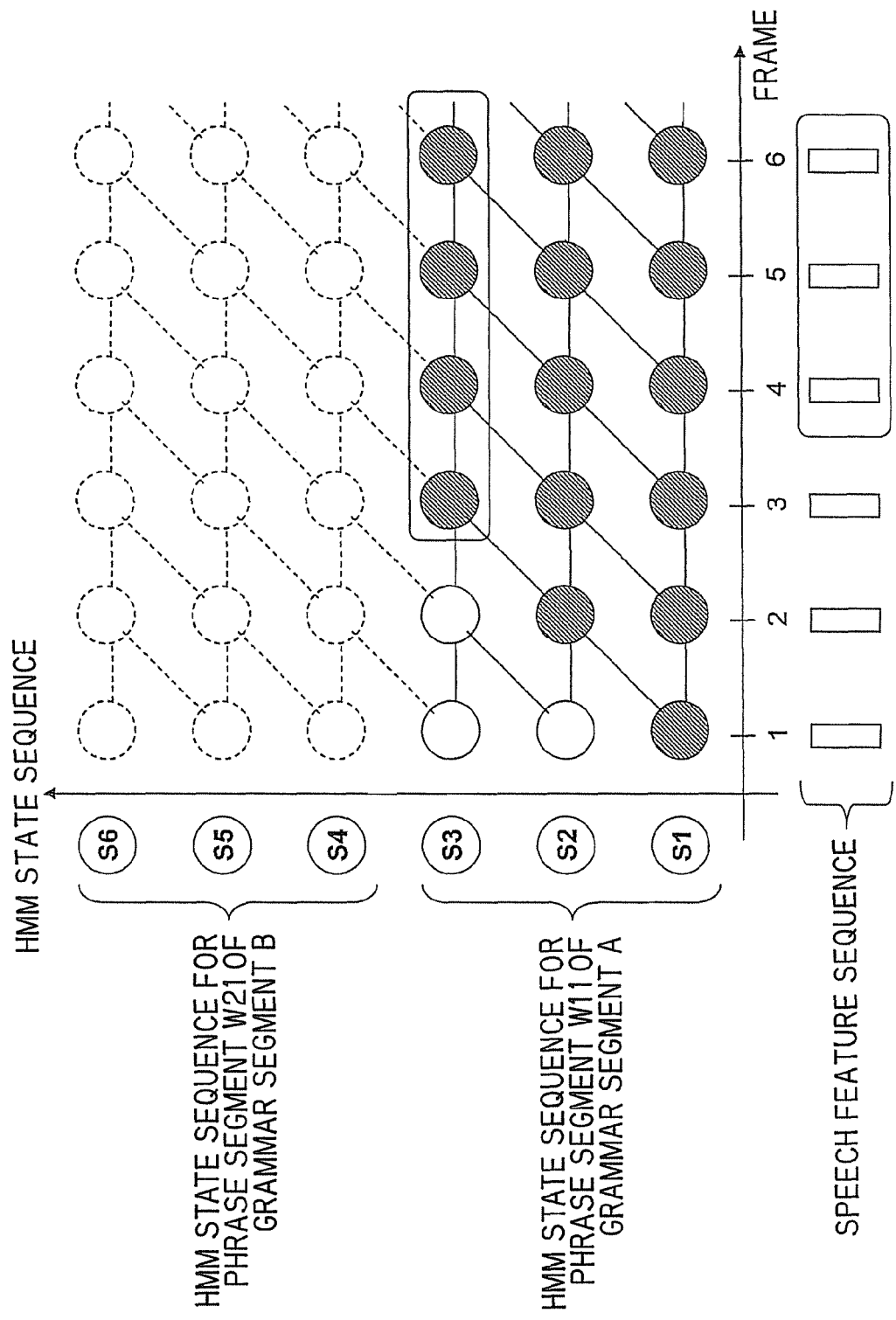
FIG. 16 is a drawing for explaining the decoding process carried out by the first decoder and the second decoder.

The speech feature storage unit 110 stores the speech feature sequence referred in the decoding process carried out by the second decoder 108 while the grammar transfer unit 104 transfers the grammar segment in one-to-one correspondence with the frame numbers. Referring to FIG. 12 and FIG. 16, this operation will be described.

An area in a frame line in FIG. 12 illustrates a state of calculation of the forward probability carried out by the second decoder 108. In the example shown in FIG. 12, the forward probabilities of the HMM state sequences S1 to S3 corresponding to the phrase segment W11 described in the grammar segment A from the fourth frame (t=4) to the sixth frame (t=6) are calculated. At this time, the speech feature storage unit 110 stores the speech feature sequences x(4), x(5) and x(6) which are referred to in the decoding process carried out by the second decoder 108 in one-to-one correspondence with the frame numbers as exemplified in the frame line (speech feature sequence) shown in FIG. 16.

(4) Probability Storage Unit 111

When the first decoder 107 and the second decoder 108 have calculated the forward probabilities to the final state of the HMM state sequence corresponding to the phrase segment including a trailing phrase segment, the probability storage unit 111 stores the state number of the final state and the forward probability in one-to-one correspondence with the frame numbers.

The operation will be described referring to FIG. 11, FIG. 12 and FIG. 16.

FIG. 11 shows a state in which the first decoder 107 calculates the forward probability of the HMM state sequence corresponding to the phrase segment W11 described in grammar segment A. In FIG. 11, the forward probability of the final state S3 of the HMM state sequence corresponding to the phrase segment W11 in the third frame (t=3) is calculated.

An area within the frame line in FIG. 12 shows a state of calculation of the forward probability of the HMM state sequence corresponding to the phrase segment W11 described in the grammar segment A carried out by the second decoder 108. The calculation of the forward probability is carried out in parallel to the transfer of the grammar segment B carried out by the grammar transfer unit 104.

FIG. 16 is a drawing in which FIG. 11 and FIG. 12 are combined, collectively showing the state of calculation of the forward probability carried out by the first decoder 107 and the second decoder 108 described thus far. The are surrounded by the frame line in FIG. 16 is the forward probability of the final state S3 in the HMM stat sequence calculated by the first decoder 107 and the second decoder 108.

Figure 17:
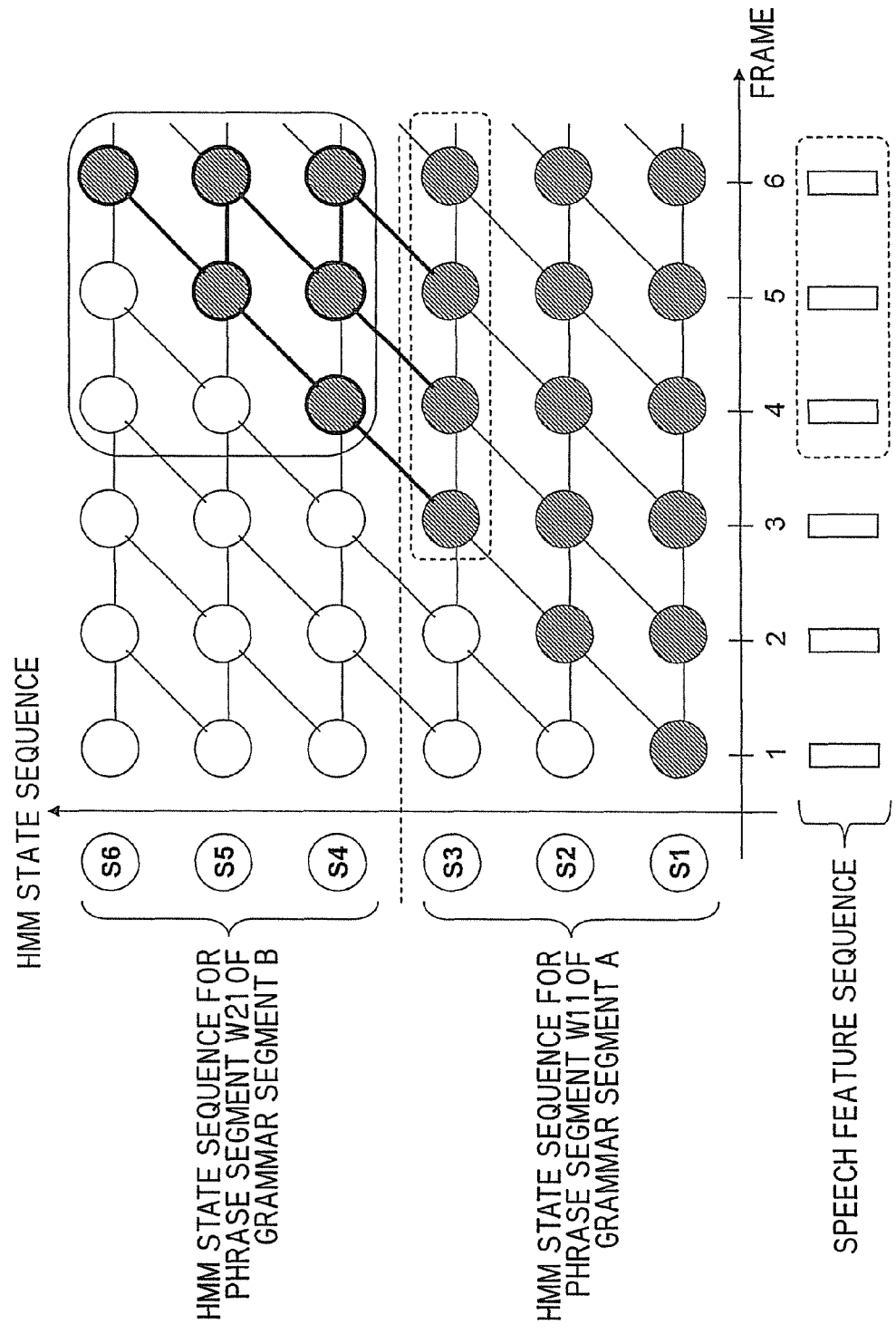
FIG. 17 is a drawing for explaining the decoding process carried out by a third decoder.

In the example shown in FIG. 17, the forward probability of the final state S3 is calculated in the period from the third frame (t=3) to the sixth frame (t=6). At this time, the probability storage unit 111 stores the state number and the forward probability $\alpha(3, 3)$, $\alpha(3, 4)$, $\alpha(3, 5)$ and $\alpha(3, 6)$ of the final state S3 in the HMM state sequence shown in the frame line in FIG. 17 in one-to-one correspondence with the frame numbers.

(5) Third Decoder 109

The third decoder 109 calculates the forward probability of the HMM state sequence corresponding to the vocabularies to be recognized described in the trailing grammar segment, which is transferred by the grammar transfer unit 104, and the phrase segment thereof for the speech feature sequence stored in the speech feature storage unit 110 from the time point when the transfer of the grammar segment carried out by the grammar transfer unit 104 is completed. In this calculation of the forward probability, the forward probability of the final state of the HMM state sequence corresponding to the preceding phrase segment stored in the probability storage unit 111 is referred to This operation will be described with the example shown in FIG. 17.

An area surrounded by the broken frame line in FIG. 17 shows the speech feature sequences x(4), x(5) and x(6) stored in the speech feature storage unit 110 and the forward probabilities $\alpha(3, 3)$, $\alpha(3, 4)$, $\alpha(3, 5)$ and $\alpha(3, 6)$ stored in the probability storage unit 111 in an example shown in FIG. 16. An area surrounded by the frame line in FIG. 17 shows a state in which the third decoder 109 calculates the forward probability of the HMM state sequence for the speech feature sequence stored in the speech feature storage unit 110. At this time, in order to calculate the forward probability of the HMM state sequence in the frame line in FIG. 17, it is necessary to refer to the speech feature sequences x(4), x(5) and x(6) surrounded by the broken line frame in FIG. 17, and the forward probabilities $\alpha(3, 3)$, $\alpha(3, 4)$, $\alpha(3, 5)$ and $\alpha(3, 6)$. These values are stored in the speech feature storage unit 110 and the probability storage unit 111 as described above.

In order to calculate the forward probability of the $t^{th}$ frame by the third decoder 109, only the forward probability $\alpha(i, t-1)$ in the $t-1^{st}$ frame must be stored in addition to the speech feature sequence stored in the speech feature storage unit 110 and the forward probability of the final state stored in the probability storage unit 111. In the example shown in FIG. 17, in order to calculate the forward probability $\alpha(i, 5)$ ($4=<i=<5$) in the fifth frame (t=5), only the forward probability $\alpha(i, 4)$ (i=4) calculated in the fourth frame (t=4) must be stored. Furthermore, in order to calculate the forward probability of the sixth frame (t=6), only the forward probability calculated in the fifth frame (t=5) must be stored and the forward probability calculated in the fourth frame (t=4) does not have to be stored. In this manner, in the calculation of the forward probability carried out by the third decoder 109, the number of the forward probabilities $\alpha(i, t)$ to be stored in the process of calculation is significantly reduced.

In the calculation of the forward probability carried out by the first decoder 107 and the second decoder 108 as well, only the forward probability in the $t-1^{st}$ frame must be stored in order to calculate the forward probability in the $t^{th}$ frame. Therefore, the number of forward probabilities to be stored in the process of calculation is significantly reduced.

The first decoder 107 and the second decoder 108 must only refer to the speech feature x(t) in the $t^{th}$ frame, and it is not necessary to store other speech feature sequences.

(6) Recognition Control Unit 106

The recognition control unit 106 monitors the state of transfer of the grammar segment carried out by the grammar transfer unit 104, and switches the operation between the first decoder 107, the second decoder 108 and the third decoder 109 according to the state of transfer.

First of all, when the grammar transfer unit 104 starts the transfer of the grammar segment according to the progress of the decoding process carried out by the first decoder 107, the recognition control unit 106 switches the operation from the first decoder 107 to the second decoder 108 to carry out the decoding process by the second decoder 108 in parallel to the transfer of the grammar segment.

Then, upon completion of the transfer of the grammar segment carried out by the grammar transfer unit 104, the recognition control unit 106 switches the operation from the second decoder 108 to the third decoder 109 to start the decoding process carried out by the third decoder 109.

Then, at the time point when the third decoder 109 has completed the decoding process for the speech feature sequence stored in the speech feature storage unit 110, the recognition control unit 106 switches the operation from the third decoder 109 to the first decoder 107 to restart the decoding process carried out by the first decoder 107.

(7) Operation

Figure 18A:
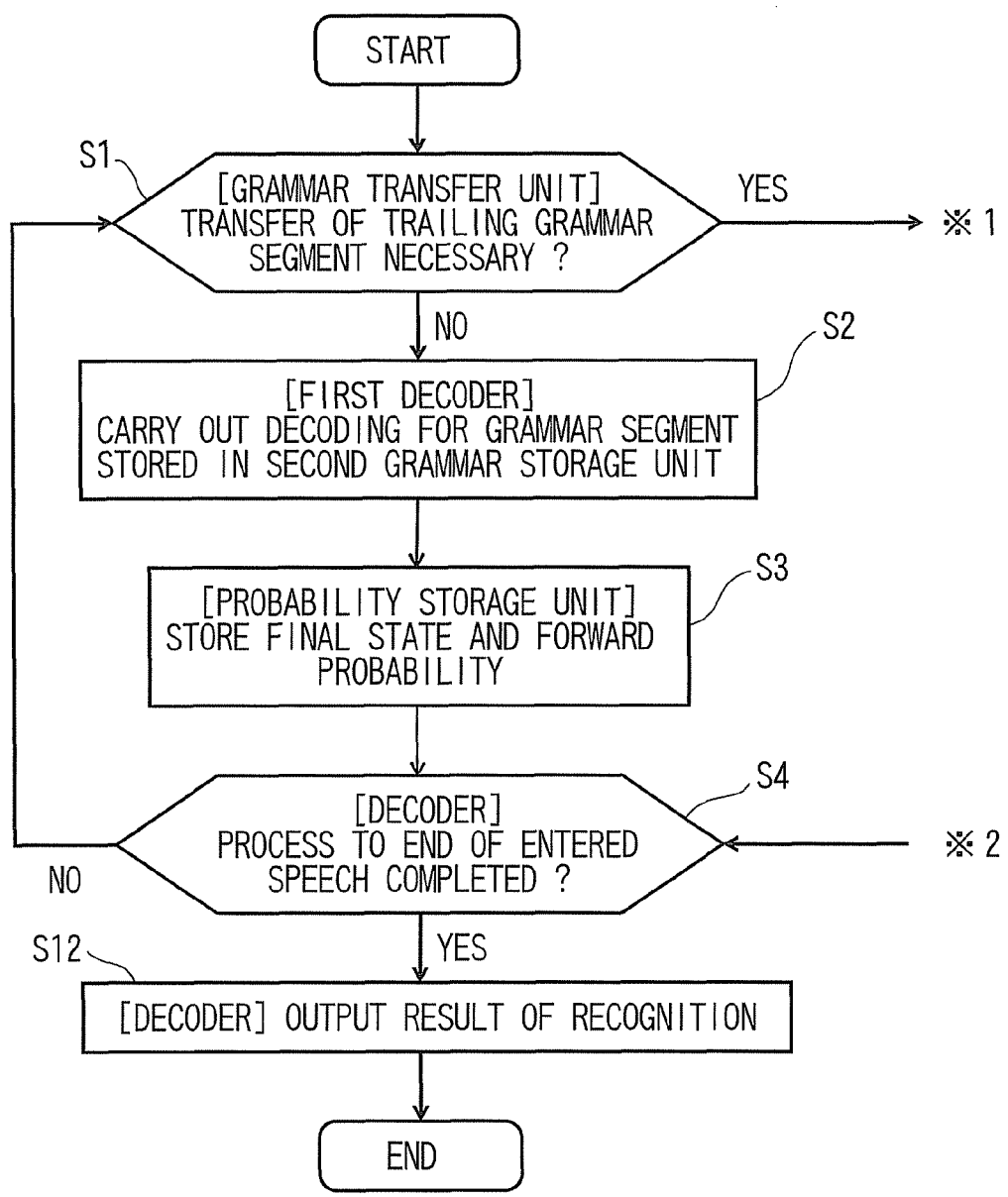
FIG. 18 is a flowchart of a second embodiment.
Figure 18B:
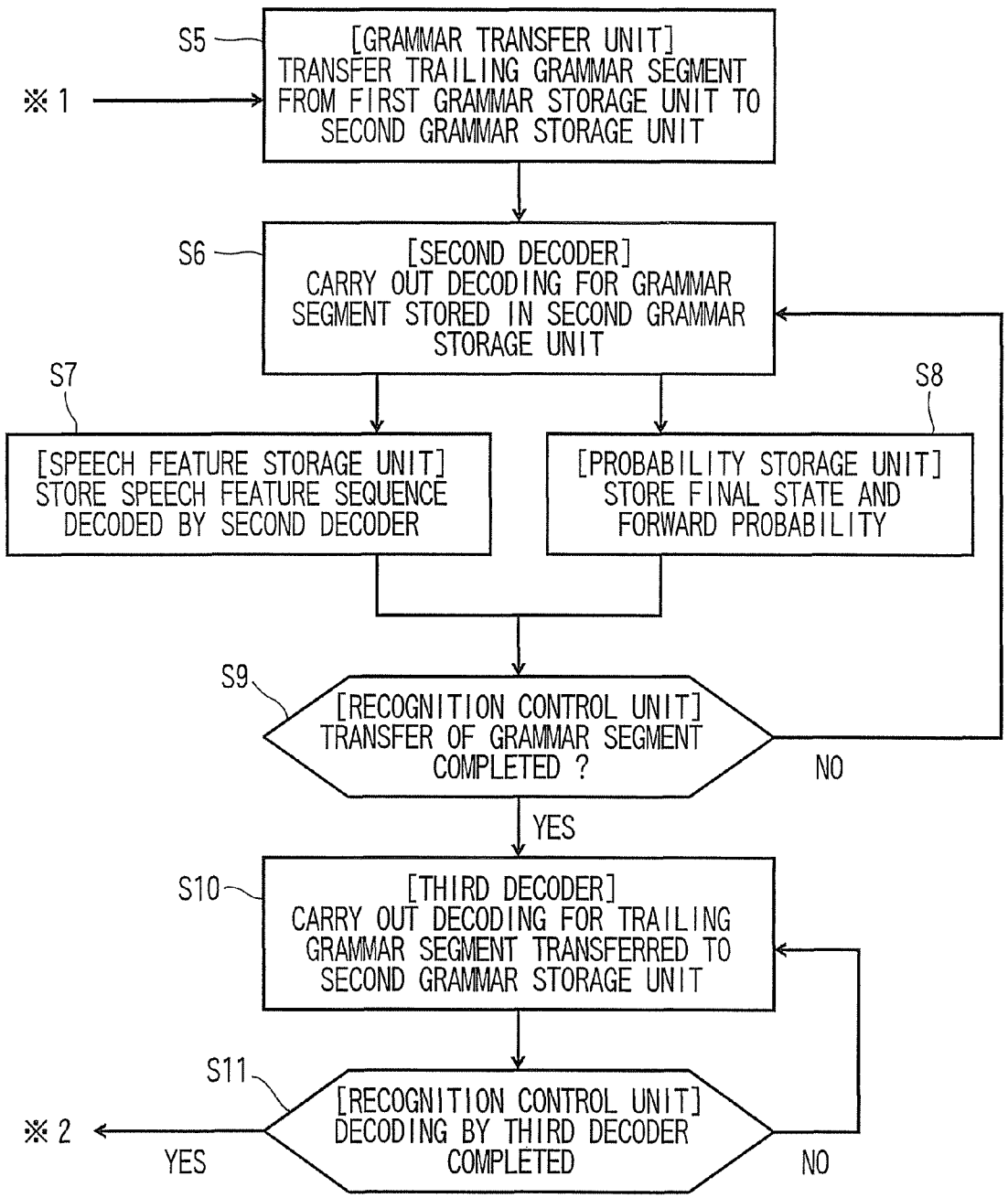

Referring now to FIG. 18, operation of the second embodiment will be described. FIG. 18 is a flowchart showing an example of the operation of the second embodiment.

Since the operation flow of the feature extracting unit 101 is apparent for those skilled in the art, the description thereof is omitted in this flowchart. The operation on the basis of the flowchart in FIG. 18 will be described step by step (Operation Steps S1 to S15) below.

(S1): The grammar transfer unit 104 determines whether transfer of the grammar segment is necessary or not on the basis of the progress of the decoding process carried out by the first decoder 107. When the transfer of the grammar segment is necessary, the procedure goes to Step S4. If not, the procedure goes to Step S2.

(S2): The first decoder 107 refers to the grammar segment stored in the second grammar storage unit 103 and carries out the decoding process.

(S3): The probability storage unit 111 stores the forward probability of the final state of the HMM state sequence corresponding to the phrase segment having the trailing phrase from among the forward probabilities calculated by the first decoder 107 in one-to-one correspondence with the frame number.

(S4): When the decoding process carried out by the first decoder 107 or the second decoder 108 has completed for the speech feature corresponding to the end of the entered speech, the procedure goes to Step S7. If not, the procedure goes to Step S1 to continue the decoding process.

(S5): The grammar transfer unit 104 transfers the grammar segment required by the first decoder 107 from the first grammar storage unit 102 to the second grammar storage unit 103.

(S6): The second decoder 108 refers to the grammar segment stored in the second grammar storage unit 103, and carries out the decoding process in parallel to the transfer of the grammar segment carried out by the grammar transfer unit 104.

(S7): The speech feature storage unit 110 stores the speech feature sequence referred to in the calculation of the forward probability carried out by the second decoder 108 in one-to-one correspondence with the frame number.

(S8): The probability storage unit 111 stores the forward probability of the final state of the HMM state sequence corresponding to the phrase segment having the trailing phrase from among the forward probabilities calculated by the second decoder 108 in one-to-one correspondence with the frame number.

(S9): The recognition control unit 106 monitors the state of transfer of the grammar segment carried out by the grammar transfer unit 104. When the transfer of the grammar segment is completed, the procedure goes to Step S10. When the transfer of the grammar segment is not completed, the procedure goes to Step S6 where the second decoder 108 continues the process.

(S10): The third decoder 109 refers to the forward probability in the final state of the HMM state sequence stored in the probability storage unit 111 for the speech feature sequence stored in the speech feature storage unit 110 and carries out the decoding process.

(S11): The recognition control unit 106 monitors the third decoder 109, and when the process of the third decoder 109 is completed, the procedure goes to the step S11. If not, the procedure goes to Step S10 where the third decoder 109 continues the process.

(S12): The first decoder 107, the second decoder 108 or the third decoder 109 outputs the phase to be recognized which provides the highest forward probability as a result of recognition.

(8) Advantages

As described above, according to the second embodiment, the amount of memory for storing the forward probability and the speech feature sequence in the process of calculating the forward probability carried out by the first decoder 107, the second decoder 108 and the third decoder 109 is significantly reduced.

(9) Modification

The invention is not limited to the above-described embodiment as is, and modifications of the components may be made without departing from the scope of the invention in the stage of implementation. The invention may be modified in various manners by combining the plurality of components disclosed in the embodiment as needed. For example, some components may be eliminated from all the components disclosed in the embodiment. Furthermore, components in different embodiments may be combined as needed.

For example, in the second embodiment, the three decoders, that is, the first decoder 107, the second decoder 108 and the third decoder 109 are provided as the decoders, and the operation of these decoders is switched by the recognition control unit 106.

However, a configuration in which the first decoder 107, the second decoder 108 and the third decoder 109 are replaced by a single decoder, and the decoder switches the internal process so that the operation of the decoder becomes equivalent to the operation of the first decoder 107, the second decoder 108 or the third decoder 109 according to the instruction from the recognition control unit 106 is also applicable.

Third Embodiment

Referring now to FIG. 1, the speech recognition apparatus according to a third embodiment will be described.

The example of the configuration of the speech recognition apparatus according to the third embodiment is the same as the example of the configuration of the speech recognition apparatus according to the first embodiment shown in FIG. 1. In the third embodiment, a part of the operation of the grammar transfer unit 104 and the recognition control unit 106 is different from that of the first embodiment. Therefore, only the operation of the recognition control unit 106 in the third embodiment will be described.

(1) Characteristics of the Third Embodiment

According to the third embodiment, in the transfer of the grammar segment carried out by the grammar transfer unit 104, when the transfer of the grammar segment is not completed even when a predetermined time is elapsed, the transfer of the grammar segment is stopped. However, the predetermined time may be determined by the number of frames referred in the process carried out by the second decoder 108.

In other words, it may be determined as "100 msec from the start of the transfer of the grammar segment". It may also be determined as "when the second decoder 108 has completed the calculation of the forward probability for the five frames of the speech feature sequence from the start of the transfer of the grammar segment". The value of this time is arbitrary.

(2) Recognition Control Unit 106

The recognition control unit 106 monitors the state of transfer of the grammar segment carried out by the grammar transfer unit 104, and switches the operation between the first decoder 107 and the second decoder 108 according to the state of transfer.

At this time, when the transfer of the grammar segment carried out by the grammar transfer unit 104 is stopped, the process in the second decoder 108 which is operated in parallel to the transfer of the grammar segment is stopped, then the operation is switched from the second decoder 108 to the first decoder 107, and the process is restarted by the first decoder 107. Alternatively, the process in the second decoder 108 is stopped and all the processes in the speech recognition apparatus are stopped, and the fact that the transfer of the grammar segment carried out by the grammar transfer unit 104 is stopped is notified to the user of the speech recognition apparatus.

(3) Advantages

According to the third embodiment, in the transfer of the grammar segment carried out by the grammar transfer unit 104, when the transfer of the grammar segment is not completed even when the predetermined time is elapsed, the grammar transfer unit 104 stops the transfer of the grammar segment, and the recognition control unit 106 switches the operation from the second decoder 108 to the first decoder 107 to continue the decoding process.

In general, the data transfer from one storage device to another storage device, the data transfer speed may be extremely lowered or the data transfer may be failed due to an unexpected problem in the storage device or the data transfer path. When such extreme lowering of the transfer speed of the grammar segment or failure of the transfer is occurred during the transfer of the grammar segment carried out by the grammar transfer unit 104, the transfer of the grammar segment carried out by the grammar transfer unit 104 is not completed, so that the operating state of the speech recognition apparatus is discontinued.

Therefore, according to the third embodiment, such extreme lowering of the transfer speed of the grammar segment or the failure of the transfer is detected by the grammar transfer unit 104, and the grammar transfer unit 104 and the recognition control unit 106 are operated accordingly, so that the discontinuation of the operating state of the speech recognition apparatus is prevented.

What is claimed is:

1. A speech recognition apparatus comprising:
   a generating unit configured to generate sequences of speech features from characteristics of entered speech for respective frames having an arbitrary temporal width;
   a model storage unit having a plurality of phrases expressed on basis of grammar and one or more continuous phrase segments obtained by dividing the respective phrase, the model storage unit configured to store state transition models which express time series changes of the speech features for respective phrase segments as state-to-state transition relating to the speech features;
   a first grammar storage unit configured to store grammar segments relating to one or more continuous phrase segments which belong to each of the phrases;
   a second grammar storage unit configured to store at least part of the grammar segments transferred from the first grammar storage unit and to be able to read out information stored therein in a reading time shorter than that required for the first grammar storage unit;
   a first decoder configured to obtain forward probabilities of respective states of the state transition models for the sequence of speech features generated by the generating unit with respect to each of the frames, by referring to the grammar segments stored in the second grammar storage unit and the state transition models stored in the model storage unit;
   a grammar transfer unit configured to transfer a trailing grammar segment relating to a trailing phrase segment which trails one of said continuous phrase segments, from the first grammar storage unit to the second grammar storage unit when the forward probability of final state among said states of the state transition models is obtained by the first decoder;
   a second decoder configured to obtain the forward probabilities of the respective states of the state transition models for a sequence of trailing speech features as the sequence of speech features for the trailing segment as generated by the generating unit with respect to each of the frames, continuously after the speech feature sequences, by referring to the grammar segments stored in the second grammar storage unit and the state transition models stored in the model storage unit;
   a third decoder configured to obtain the forward probabilities of the respective states of the state transition models for the trailing speech feature sequences for the respective frames, by referring to the trailing grammar segment transferred to the second grammar storage unit and the state transition models stored in the model storage unit;
   a recognition control unit configured to (1) carry out recognition for the respective phrases, (2) activate the first decoder until the transfer of the trailing grammar segment is started, (3) activate the second decoder in parallel to the transfer from the start to the completion of the transfer, (4) activate the third decoder upon completion of the transfer, and (5) repeat the operations from (2) to (4) until all the operations for the phrase segments belonging to the respective phrases to obtain final forward probabilities for the respective phrases; and
   a recognizing unit configured to output the phrase which give the highest forward probability from among the respective final forward probabilities of the plurality of phrases as a result of recognition of the speech feature sequence.

2. The apparatus according to claim 1, wherein the first decoder and the third decoder are integrated with each other.

3. The apparatus according to claim 1, further comprising:
   a probability storage unit configured to store the forward probabilities of the final state for said one of continuous phrase segments, which is obtained by the first decoder, and the final state for the trailing phrase segment, which is obtained by the second decoder, by associating with number of the states up to the final state and with frame number up to current one of the frames; and
   a speech feature storage unit configured to store the sequence of trailing speech features for the respective frames by associating with the frame numbers,
   wherein the third decoder obtains the forward probabilities of the respective states of the state transition models for the stored sequence of trailing speech features by referring to the transferred trailing grammar segments, the stored forward probabilities of the final states, the numbers of the states and the frame numbers.

4. The apparatus according to claim 1, wherein the grammar transfer unit stops the transfer of the trailing grammar segments when the transfer is not completed even when a predetermined time is elapsed.

5. The apparatus according to claim 4, wherein the recognition control unit activates the first decoder when the transfer is not completed even when the predetermined time is elapsed.

6. A speech recognition method carried out by the speech recognition apparatus including a model storage unit having a plurality of phrases expressed on basis of grammar and one or more continuous phrase segments obtained by dividing the respective phrase, the model storage unit configured to store state transition models which express time series changes of the speech features for respective phrase segments as state-to-state transition relating to the speech features;

a first grammar storage unit configured to store grammar segments relating to one or more continuous phrase segments which belong to each of the phrases; and a second grammar storage unit configured to store at all the steps or one step of grammar segments transferred from the first grammar storage unit and to be able to read out information stored therein in a reading time shorter than that required for the first grammar storage unit;

the method comprising:

a generating step of generating sequences of speech features from characteristics of entered speech for respective frames having an arbitrary temporal width;

a first decoding step of obtaining forward probabilities of respective states of the state transition models for the sequence of speech features generated in the generating step with respect to each of the frames, by referring to the grammar segments stored in the second grammar storage unit and the state transition models stored in the model storage unit;

a grammar transferring step of transferring a trailing grammar segment relating to a trailing phrase segment which trails one of said continuous phrase segments, from the first grammar storage unit to the second grammar storage unit when the forward probability of final state among said states of the state transition models is obtained in the first decoding step;

a second decoding step of obtaining the forward probabilities of the respective states of the state transition models for a sequence of trailing speech features as the sequence of speech features for the trailing segment as generated by the generating unit with respect to each of the frames, continuously after the speech feature sequences, by referring to the grammar segments stored in the second grammar storage unit and the state transition models stored in the model storage unit;

a third decoding step of obtaining the forward probabilities of the respective states of the state transition models for the trailing speech feature sequences for the respective frames, by referring to the trailing grammar segment transferred to the second grammar storage unit and the state transition models stored in the model storage unit;

a recognition controlling step of (1) carrying out recognition for the respective phrases, (2) activating the first decoding step until the transfer of the trailing grammar segment is started, (3) activating the second decoding step in parallel to the transfer from the start to the completion of the transfer, (4) activating the third decoding step upon completion of the transfer, and (5) repeating the operations from (2) to (4) until all the operations for the phrase segments belonging to the respective phrases to obtain final forward probabilities for the respective phrases; and a recognizing step of outputting the phrase which give the highest forward probability from among the respective final forward probabilities of the plurality of phrases as a result of recognition of the speech feature sequence.

7. The method according to claim 6, wherein the first decoding step and the third decoding step are integrated with each other.

8. The method according to claim 6, further comprising:
a probability storage unit configured to store the forward probabilities of the final state for said one of continuous phrase segments, which is obtained by the first decoding step, and the final state for the trailing phrase segment, which is obtained by the second decoding step, by associating with number of the states up to the final state and with frame number up to current one of the frame; and a speech feature storage unit configured to store the sequence of trailing speech features for the respective frames by associating with the frame numbers, wherein the third decoding step obtains the forward probabilities of the respective states of the state transition models for the stored sequence of trailing speech features by referring to the transferred trailing grammar segments, the stored forward probabilities of the final states, the number of the states and the frame numbers.

9. The method according to claim 8, wherein the grammar transferring step stops the transfer of the trailing grammar segments when the transfer is not completed even when a predetermined time is elapsed.

10. The method according to claim 9, wherein the recognition controlling step activates the first decoding step when the transfer is not completed even when the predetermined time is elapsed.

11. A speech recognition program stored in a non-transitory computer-readable medium and being executable in a computer, the computer comprising:

a model storage unit having a plurality of phrases expressed on basis of grammar and one or more continuous phrase segments obtained by dividing the respective phrase segments, the model storage unit configured to store state transition models which express time series changes of the speech features for respective phrase segments as state-to-state transition relating to the speech features;

a first grammar storage unit configured to store respective instructed grammar segments relating to one or more continuous phrase segments which belong to each of the phrases; and a second grammar storage unit configured to store at least part of the grammar segments transferred from the first grammar storage unit and to be able to read out information stored therein in a reading time shorter than that required for the first grammar storage unit;

the program comprising:

a generating instruction of generating sequences of speech features from characteristics of entered speech for respective frames having an arbitrary temporal width;

a first decoding instruction of obtaining forward probabilities of respective states of the state transition models for the sequence of speech features generated by the generating instruction with respect to each of the frames, by referring to the grammar segments stored in the second grammar storage unit and the state transition models stored in the model storage unit;

a grammar transferring instruction of transferring a trailing grammar segment relating to a trailing phrase segment which trails one of said continuous phrase segments, from the first grammar storage unit to the second grammar storage unit when the forward probability of final state among said states of the state transition models is obtained by the first decoding instruction;

a second decoding instruction of obtaining the forward probabilities of the respective states of the state transition models for a sequence of trailing speech features as the sequence of speech features for the trailing segment as generated the generating instruction with respect to each of the frames, continuously after the speech feature sequences, by referring to the grammar segments stored in the second grammar storage unit and the state transition models stored in the model storage unit;

a third decoding instruction of obtaining the forward probabilities of the respective states of the state transition models for the trailing speech feature sequences for the respective frames, by referring to the trailing grammar segment transferred to the second grammar storage unit and the state transition models stored in the model storage unit;

a recognition controlling instruction of (1) carrying out recognition for the respective phrases, (2) activating the first decoding instruction until the transfer of the trailing grammar segment is started, (3) activating the second decoding instruction in parallel to the transfer from the start to the completion of the transfer, (4) activating the third decoding instruction upon completion of the transfer, and (5) repeating the operations from (2) to (4) until all the operations for the phrase segments belonging to the respective phrases to obtain final forward probabilities for the respective phrases; and a recognizing instruction of outputting the phrase which gives the highest forward probability from among the respective final forward probabilities of the plurality of phrases as a result of recognition of the speech feature sequence.

12. The program according to claim 11, wherein the first decoding instruction and the third decoding instruction are integrated with each other.

13. The program according to claim 11, the computer further comprising:

a probability storage unit configured to store the forward probabilities of the final state for said one of continuous phrase segments, which is obtained by the first decoding instruction, and the final state for the trailing phrase segment, which is obtained by the second decoding instruction, by associating with number of the states up to the final state and with frame number up to current one of the frame; and a speech feature storage unit configured to store the sequence of trailing speech features for the respective frames by associating with the frame numbers, wherein the third decoding instruction obtains the forward probabilities of the respective states of the state transition models for the stored sequence of trailing speech features by referring to the transferred trailing grammar segments, the stored forward probabilities of the final states, the number of the states and the frame numbers.

14. The program according to claim 11, wherein the grammar transferring instruction stops the transfer of the trailing grammar segments when the transfer is not completed even when a predetermined time is elapsed.

15. The program according to claim 14, wherein the recognition controlling instruction activates the first decoding instruction when the transfer is not completed even when the predetermined time is elapsed.

* * * * *